(12) United States Patent
Pacione et al.

(10) Patent No.: US 7,919,034 B2
(45) Date of Patent: Apr. 5, 2011

(54) SYSTEM AND METHODS OF MANUFACTURING HOOK PLATES

(75) Inventors: Joseph Rocco Pacione, Newmarket (CA); Thomas Krivec, Zeltweg (AT); Franz Rittmannsberger, Richmond Hill (AT); Robert Sailer, St. Peter-Freienstein (AT)

(73) Assignee: Tac-Fast Georgia L.L.C., Atlanta, GA (US)

( * ) Notice: Subject to any disclaimer, the term of this patent is extended or adjusted under 35 U.S.C. 154(b) by 0 days.

(21) Appl. No.: 10/543,904

(22) PCT Filed: Jan. 29, 2004

(86) PCT No.: PCT/CA2004/000118
§ 371 (c)(1),
(2), (4) Date: Sep. 30, 2005

(87) PCT Pub. No.: WO2004/067268
PCT Pub. Date: Aug. 12, 2004

(65) Prior Publication Data
US 2006/0096071 A1 May 11, 2006

Related U.S. Application Data

(60) Provisional application No. 60/443,561, filed on Jan. 30, 2003.

(51) Int. Cl.
*B29C 51/14* (2006.01)

(52) U.S. Cl. ...... 264/319; 264/320; 264/334; 264/328.1
(58) Field of Classification Search .................. 264/319
See application file for complete search history.

(56) References Cited

U.S. PATENT DOCUMENTS

| 3,031,730 | A | | 5/1962 | Morin | |
| 5,750,227 | A | | 5/1998 | Adams | |
| 5,770,124 | A | * | 6/1998 | Marecki et al. | 264/1.36 |
| 5,948,337 | A | | 9/1999 | Sakakibara | |
| 5,980,230 | A | * | 11/1999 | Dowd et al. | 425/324.1 |
| 6,143,222 | A | | 11/2000 | Takizawa | |
| 6,592,800 | B1 | * | 7/2003 | Levitt et al. | 264/479 |
| 6,605,332 | B2 | * | 8/2003 | Calhoun et al. | 428/91 |

FOREIGN PATENT DOCUMENTS

| FR | 2 362 257 A1 | 3/1978 |
| FR | 2 582 210 A1 | 11/1986 |
| JP | S49-30420 | 8/1974 |

(Continued)

OTHER PUBLICATIONS

InterfaceFLOR, Spring Catalog, 2006, pp. 1-56, Canada.

*Primary Examiner* — Monica A Huson
(74) *Attorney, Agent, or Firm* — Christopher N. Hunter; Brian W. Gray; Ogilvy Renault LLP

(57) ABSTRACT

A system and method for manufacturing a substrate having a bed of hooks located therein, in particular a system or manufacturing a hook plate having hooks with enlarged shaped heads. The system can include the use of a heated generally flat coining plate, a resilient layer placed under the hook plate, and a forming sheet placed between the coining plate and the tops of stems to be coined.

57 Claims, 21 Drawing Sheets

FOREIGN PATENT DOCUMENTS

| | | |
|---|---|---|
| JP | S52-49519 | 4/1977 |
| JP | 61-187582 U | 11/1986 |
| JP | 2-32151 Y | 8/1990 |
| JP | 03-251204 | 11/1991 |
| JP | 04-059397 | 2/1992 |
| JP | 05-073968 | 3/1993 |
| JP | 11-170382 | 6/1999 |
| WO | WO 95/19242 A1 | 7/1995 |
| WO | WO 98/30381 A1 | 7/1998 |
| WO | WO 00/60974 A1 | 10/2000 |

* cited by examiner

SYSTEM AND METHODS OF MANUFACTURING HOOK PLATES

This application is a national phase entry of PCT/CA2004/000118 filed Jan. 29, 2004 designating the United States, which claims priority from U.S. Patent Application No. 60/443,561 filed Jan. 30, 2003. All of these applications are incorporated herein by reference. International Patent Application No. PCT/CA2004/000118 was published in English under Article 21 of the Patent Cooperation Treaty under WO 2004/067268 on Aug. 12, 2004.

FIELD OF THE INVENTION

This invention relates to an injection-molded sheet-like piece of relatively large dimension and having a plurality of integrally formed stems extending therefrom, and a method of manufacturing the piece. The invention also relates to a method of coining heat-deformable stems upstanding from a base member to form hooked portions of a hook and loop fastening system, and a product obtained by such method.

BACKGROUND OF THE INVENTION

The "hook and loop" fastener system is a known system providing a releasable coupling between a substrate having hooks and a substrate having loops. Individual loops mate with individual hooks and collectively the system of coupled hooks and loops provide a securing system for two bodies attached to the substrates of hooks and loops. Thermoplastic fastener products having an array of integrally formed, upstanding, engageable fastener hooks can be used with a complementary array of loops (or other complementary fastener elements) to create a system for detachably attaching two surfaces.

One method of producing hooks is to have a sheet of molded stems, and then "coin" a head onto each stem. The coining process involves, generally, applying a heated surface with cavities to the head of each stem, so the top of the head is deformed by one of the cavities to provide a form that can securely mate with a loop on an opposing sheet. One such method is described in U.S. Pat. No. 5,980,230, which issued to Dowd et al. on Nov. 9, 1999.

When coining arrays of mushroom-head hooks for use with complementary loops, it is important that the mushroom heads and stems have similar dimensions and shape. If there are regions having different sizes and shapes of mushroom heads and stems, different regions will provide differing degrees of coupling with a given array of loops in a hook-and-loop detachable attachment system. For example, if a region has mushroom heads which are too small, then for that region there may be only a loose coupling of the loops to the hooks. In contrast, if the heads are too large, then (1) the ease of coupling a hook to a loop decreases and (2) for coupled hooks to loops, it may require more "tearing" force to detach the hook-and-loop parts of the hook-and-loop detachable attachment system.

Such problems are magnified when it is desired to form an array of many small mushroom shaped hooks across a relatively wide hook plate. It is believed that previous methods for molding hooks on a flat surface have only been applied to relatively small work-pieces.

SUMMARY OF THE INVENTION

In the preferred embodiment, the hook plates manufactured by the present invention are of a relatively large design size—from 12" by 12" to 36" by 36", but typically of a size of 24" by 24". The stems to be coined into hooks having enlarged heads are 1 mm high and 0.55 mm in diameter. After coining, the hooks, which are preferably "mushroom-shaped", are approximately 0.7 mm high. This large size of the hook sheet combined with the comparatively small size of the hooks creates a number of challenges in the manufacturing process.

Generally, this method of manufacturing a hook plate with mushroom-head hooks first involves injection-molding a hook plate with an upstanding array of stems. By pressing a heated, generally flat coining plate against the tops of the stems, an array of stems with enlarged heads is created.

There will be variations within the production tolerance across the hook plate. Such variations become more prominent with hook plates having a larger horizontal dimension. Variations in thicknesses across a hook plate may cause the enlarged heads formed through the above-noted coining process to be of different sizes and the stems to be of different heights.

These effects are, of course, magnified when this coining process is applied to a hook plate which by design has areas of different thicknesses.

It has been found that placing a resilient layer under the hook plate during coining is advantageous to coining an acceptable array of hooks. It has also been found to be advantageous to place a sheet, called a forming sheet in this application, between the coining plate and the tops of the stems before coining. Appropriate combinations of time and temperature have also been investigated.

In accordance with a broad aspect of the present invention there is provided a process for forming shaped heads on distal ends of stems connected at proximal ends to an upper side of a generally flat substrate. The process includes the steps of placing the substrate on top of a resilient sheet, and applying heat and pressure to the distal ends of the stems by means of a heated coining surface to cause softening of a portion of the distal ends of the stems and the formation of shaped heads on the distal ends of the stems.

According to a second aspect of the invention, there is provided a process for manufacturing hooks on a hook plate with an array of upstanding stems. The process includes the steps of placing a resilient layer beneath the hook plate, and applying a heated coining surface against the tops of the array of upstanding stems to create enlarged heads on the upstanding stems.

According to a third aspect of the invention, there is provided a process for manufacturing hooks on a hook plate with an array of upstanding stems, in which the hook plate has a first area of a first thickness and the hook plate additionally has a second area of a second thickness less than the first thickness. The process includes the steps of placing a first resilient piece of a third thickness beneath the first area, placing a second resilient piece of a fourth thickness beneath the second area, and applying a heated coining surface against the tops of the array of upstanding stems to create enlarged heads on the upstanding stems.

According to a fourth aspect of the invention, there is provided a process for manufacturing hooks on a hook plate with an array of upstanding stems, in which the process includes applying a heated coining surface against a forming sheet which in turn is located against the top of the array of upstanding stems to create enlarged heads on tops of the upstanding stems.

According to a fifth aspect of the invention, there is provided a process for manufacturing hooks on a hook plate with an array of upstanding stems using a coining plate. The process includes the step of inserting a forming sheet between the coining plate and the tops of the array of upstanding stems, coining the hooks on the tops of the upstanding stems, and removing the coining plate from contact with the forming sheet.

According to a sixth aspect of the invention, there is provided a method of molding a hook plate bearing hooks. The method includes the steps of injection-molding a hook plate bearing an upstanding array of stems, ejecting the hook plate, placing a forming sheet on top of the array of stems, placing the hook plate on a resilient layer, coining heads on the tops of the stems, allowing the hook plate and forming sheet to cool, and removing the forming sheet.

According to a seventh aspect of the invention, there is provided a process for manufacturing hooks on a hook plate with an array of upstanding stems. The process according to this aspect includes the step of applying a generally flat heated coining surface against the top of the array of upstanding stems to create enlarged heads on tops of the upstanding stems.

According to an eighth aspect of the invention, there is provided a process for manufacturing hooks on a hook plate with an array of upstanding stems. The process includes the steps of placing a forming sheet on top of the array of stems, and applying a generally flat heated coining surface against the forming sheet to create enlarged heads on tops of the upstanding stems.

According to a ninth aspect of the invention, there is provided a process for manufacturing hooks on a hook plate with an array of upstanding stems using a coining plate. The process includes the steps of placing the hook plate on top of a resilient sheet, and coining the hooks on the tops of the upstanding stems.

Related to the invention(s) disclosed herein are invention (s) disclosed in United States Provisional Patent Application entitled "Improved anchor sheet", filed concurrently herewith and incorporated herein by reference. Also of interest, in that the applications describe, for instance products and processes which can be used with or applied to inventions described herein are:

United States Provisional Patent Application entitled "Carpet tile, installation, and methods of manufacture and installation thereof", filed concurrently herewith and incorporated herein by reference;

United States Provisional Patent Application entitled "Ultrasonic welding of resilient layers to plates", filed concurrently herewith and incorporated herein by reference;

United States Provisional Patent Application entitled "Floor covering having a removable decorative inlay", filed concurrently herewith and incorporated herein by reference; and United States Provisional Patent Application entitled "Anchor sheet positioning and connection system", filed concurrently herewith and incorporated herein by reference.

BRIEF DESCRIPTION OF THE DRAWINGS

FIG. 4b is a picture of a typical stem on a hook plate of FIG. 4 or FIG. 4a;

FIG. 13 is a perspective view of the coining station of FIG. 5 with the resilient layer and the forming sheet of FIG. 12 coining the hook plate of FIG. 4a;

DETAILED DESCRIPTION OF EXEMPLARY EMBODIMENTS

Figure 1:
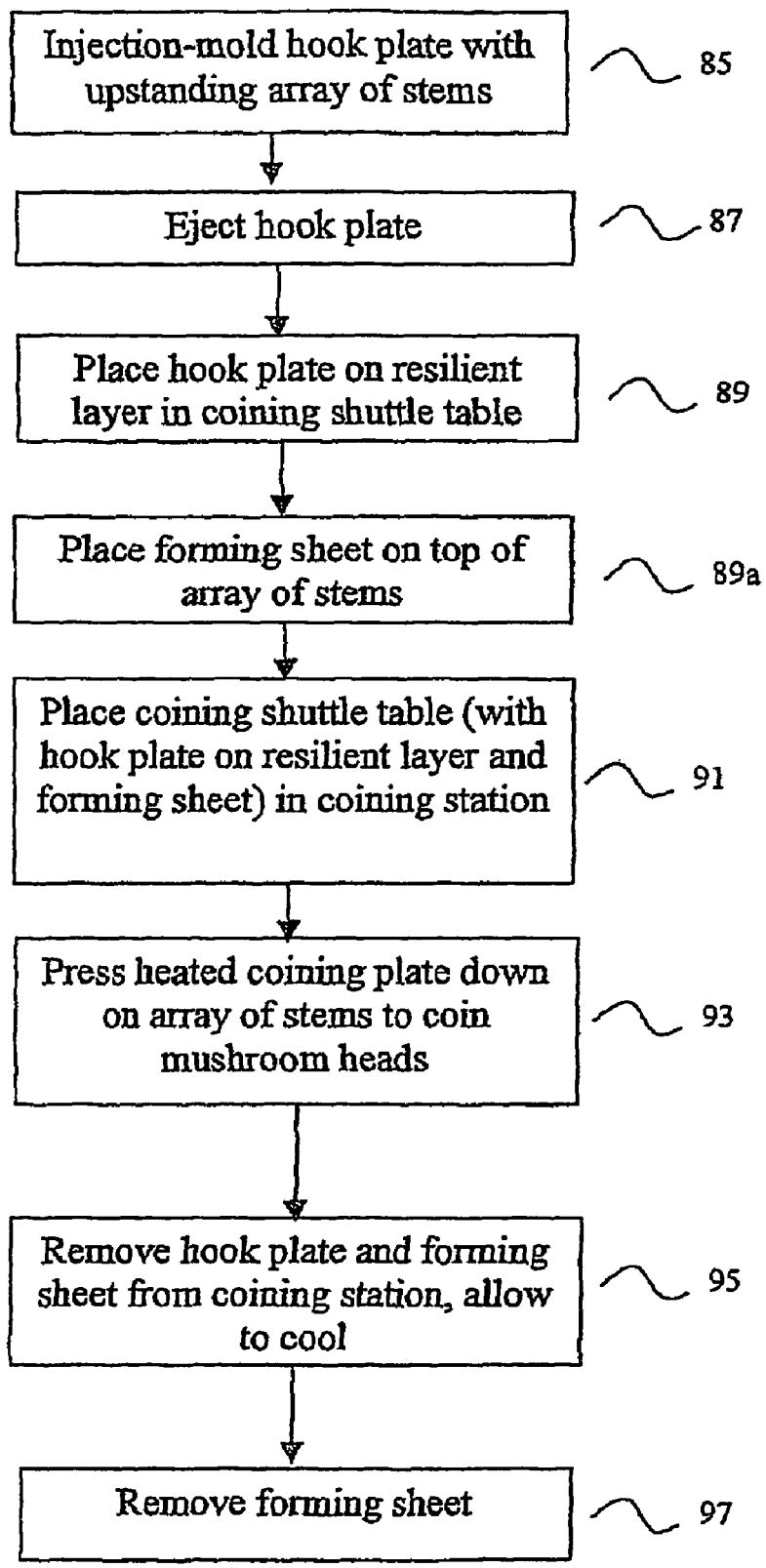
FIG. 1 is a flow chart of steps in a system and method to manufacture a hook plate embodying the invention.

A preferred system and method of manufacturing hook plates, including the molding of a plate bearing an array of stems and a subsequent coining process, is shown in FIG. 1. As will be further described in detail below, turning to FIG. 1, in step 85 the hook plate with an upstanding array of stems is produced by an injection molding process. In step 87, the hook plate is ejected from the mold. In step 89, the hook plate is placed on a resilient layer in a coining shuttle table. In step 89a, a forming sheet is placed on top of the array of stems. In step 91, the coining shuttle table (which carries the hook plate with the upstanding array of stems on a resilient layer with a forming sheet) is placed in a coining station. In step 93, the coining plate is heated and lowered onto the forming sheet and array of stems to coin heads on the stems. Details of the shape of the heads are given below. In step 95, the hook plate and forming sheet are removed from the coining station and allowed to cool. In step 97, the forming sheet is removed from the hook plate, which now bears enlarged areas at the distal end which can function as hooks in a hook and loop system. Further details on these steps follow.

Figure 2:
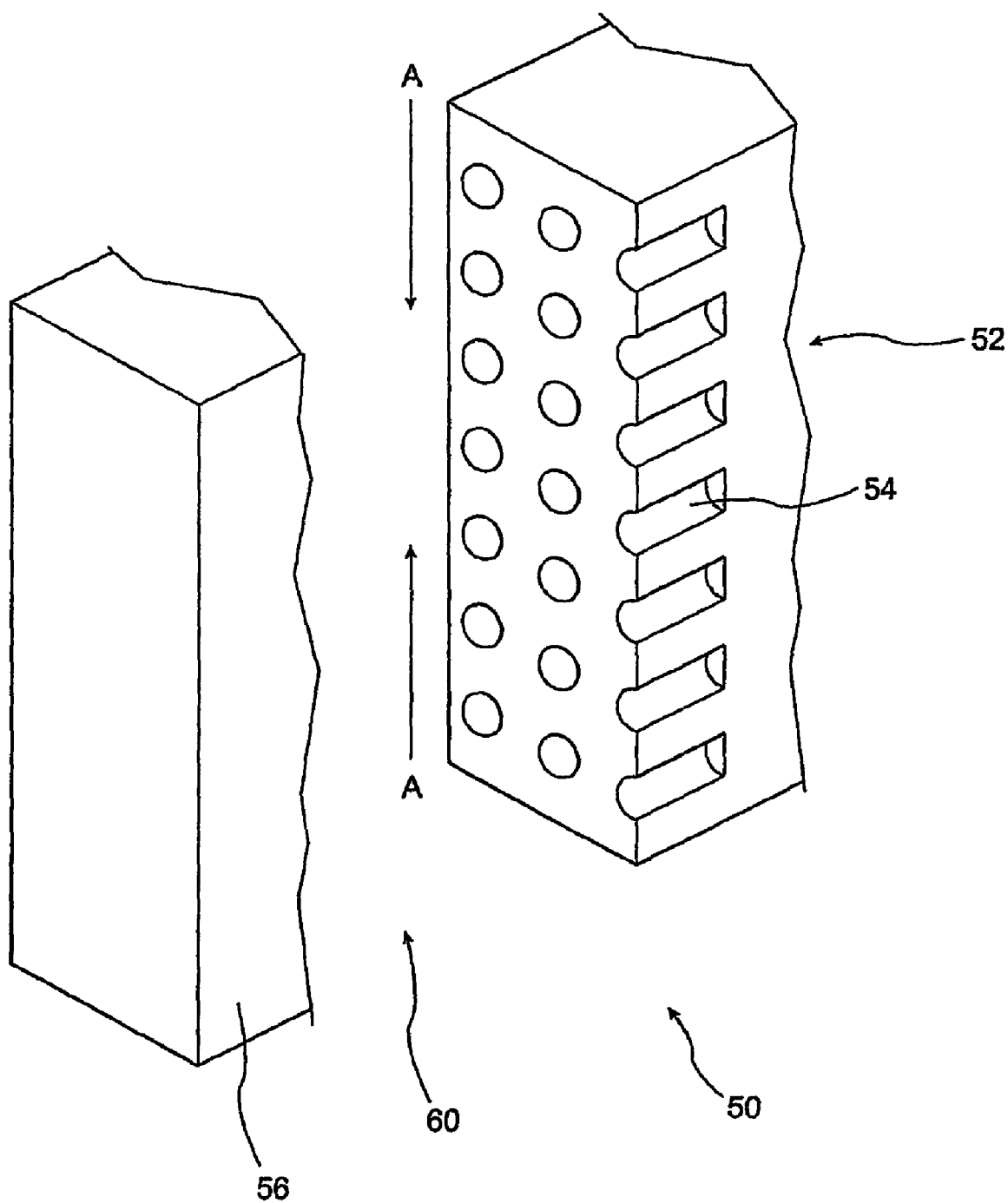
FIG. 2 is a perspective view of an injection molding apparatus for injection-molding a hook plate with an upstanding array of stems used in the process of FIG. 1.
Figure 3:
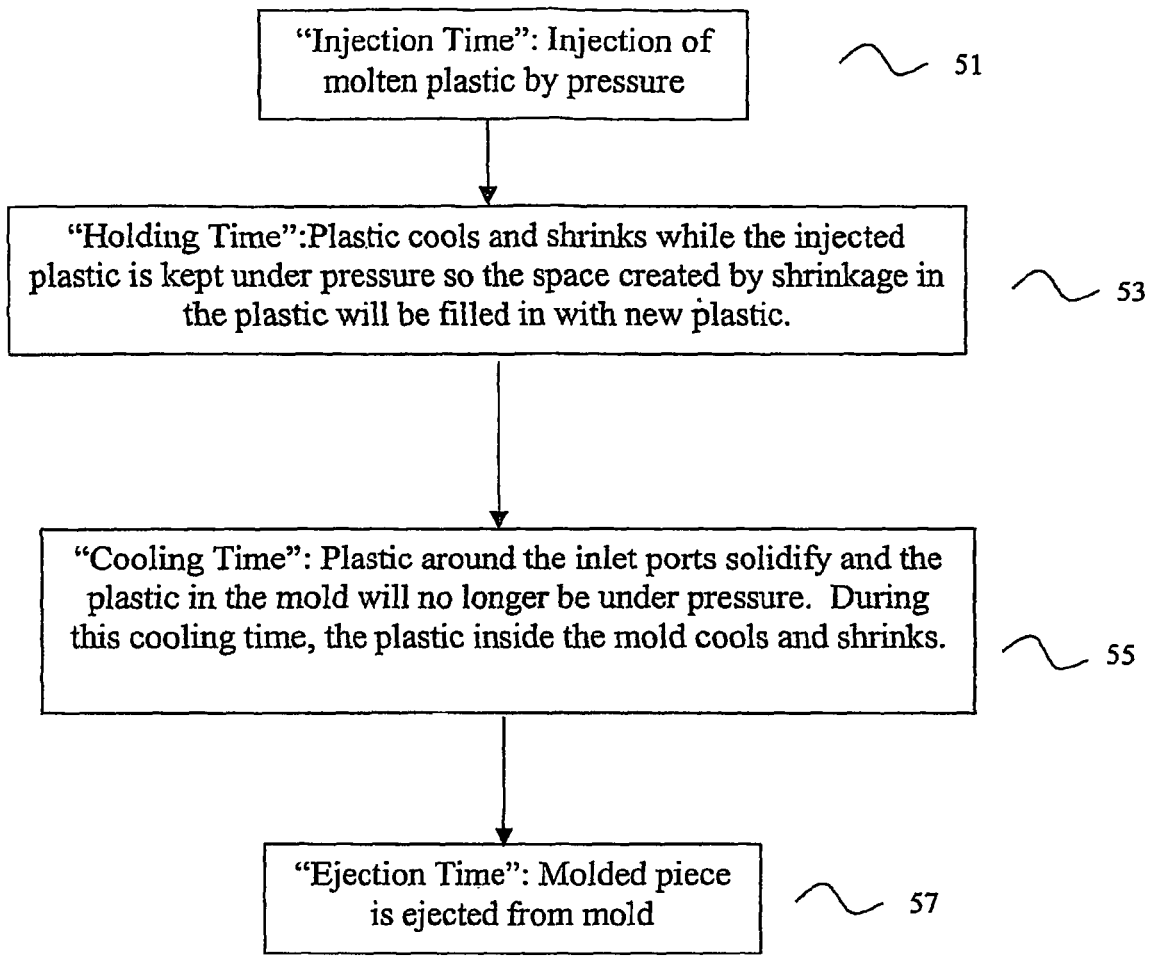
FIG. 3 is a flow chart of an injection process for the molding apparatus for injection molding of FIG. 2.

FIG. 2 shows a perspective view of a mold 50 to be used to injection-mold a relatively large hook plate with an array of relatively small stems. In one embodiment, for example, the hook plate is 24" by 24", bearing stems 1 mm high and 0.55 mm in diameter with a stem density of approximately 230 stems per square inch. A portion of the mold 52 includes a plurality of cavities 54 to create a field or array of stems. The other portion of the mold is labelled 56. The mold has injector ports (not shown) allowing molten plastic to be injected under pressure. FIG. 3 illustrates the steps to injection-mold a hook plate with an array of small stems using mold 52, under pressure. In step 51, "injection time", molten plastic is injected into the mold 50. The molten plastic will fill the array of cavities 54 and the body 60 of the mold. In step 53, "holding time", the plastic in the mold will begin to cool and shrink. The tendency of the direction of the shrinkage is an inward contraction of the hook plate laterally from its edges. The injected plastic is kept under pressure so the space created by shrinkage in the plastic in the mold will be filled with new plastic. In step 55, "cooling time", plastic around the inlet ports will solidify and the plastic in the mold will no longer be under pressure. During this cooling time, the plastic inside the mold 52 will cool and shrink. In step 57, "ejection time", the piece is ejected from the mold 52.

In a preferred embodiment, the mold is designed to produce a square hook plate of 24" (60.96 cm) by 24" (60.96 cm) horizontally, and about 3.4 mm thickness. The thickness of the plate along the edges for overlapping neighboring plates is about ½ that of the rest of the plate. The stems to be molded are 1 mm high and 0.55 mm in diameter. The density of stems is approximately 230 per square inch, with a distance between hooks of 1.8 mm arranged in a regular triangle, or approximately 128,000 stems on a 24" (60.96 cm) by 24" (60.96 cm) hook plate. A preferred plastic material is polypropylene, such as Accutuf® Impact Copolymer Developmental Grade 3934X sold by BP Amico, or ExxonMobil PP7805 E2 copolymer grade for compounding or injection molding. Accutuf® has a melt flow index of 100, a tensile yield strength of 4100 psi, a flexural modulus of $250 \times 10^3$ psi. PP7805 E2 has a melt flow index of 80 (@ T=230° C., F=2.16 kg), and a tensile strength at yield of 33 MPa (50 mm/min). Other plastics may be used such as those sold as STAMYLAN™ P 112MN40, with an ISO 1873 indication of PP-H or other thermoplastic materials. STAMYLAN has a melt flow index of 50 (@ T=230° C., F=2.16 kg), a flexural modulus of 1900 MPa, proportional strength of 35 MPa, ultimate strain of greater than 50%, and a density of 910 kg/m³ and a melting point of approximately 160° C. Other polypropylenes such as those having lower or higher melt flow indexes, for example, 80 or 100, may also be used. It will be appreciated that other materials may also be used in the injection process, including polyethylene terephthalate, nylon and other polymers. In general, the plastic from which the sheet is manufactured has a flexural modulus of between 1200 and 2600 MPa (ASTM D790), or a flexural modulus of between 1300 and 2500 MPa, or a flexural modulus of between 1400 and 2400 MPa, or a flexural modulus of between 1500 and 2300 MPa, or a flexural modulus of between 1600 and 2200 MPa, or a flexural modulus of between 1700 and 2100 MPa, or a flexural modulus of between 1800 and 2000 MPa.

The polypropylene material is injected at a temperature of approximately 280° C. and a pressure of approximately 150 bar, while the mold is internally cooled to a temperature of approximately 60° C. In a preferred embodiment, the injection time is approximately 2 seconds, the holding time is approximately 12 seconds, the cooling time is approximately 35 seconds, and the ejection time is approximately six seconds, for a total cycle time of approximately 55 seconds. Due to the large number of small stems being molded across the plate, it is important that the work-piece be ejected from the mold before the shrinkage of the work-piece is sufficient to shear the stems as they sit in the array of cavities 54. (As noted above, the plastic in body 60 of the mold will shrink in the direction of arrows A shown in FIG. 2, thereby tending to shear stems from the hook plate as they sit in the array of cavities 54) In the preferred embodiment, the total holding and cooling time is approximately 47 seconds, and it has been found that letting the hook plate cool for longer than this time results in shearing of the stems from the rest of the hook plate under the given pressure conditions for the material. Also, with the large number of small stems being molded across the plate, it is important that the hook plate be ejected from the mold at approximately the same time across the entire work-piece. Air ejectors may be used for this purpose.

The thickness of the plate, i.e., the distance between the upper surface from which the stems extend upwardly and the lower surface of the plate, is limited since increasing thickness of this element leads to a decrease in the pressure of the molten material being forced through the mold cavity. If the pressure decreases too much, then it will be insufficient to ensure that all of the stem holes become filled with plastic during the molding process.

In the case of a hooked plate of the present invention, there is a limit on the size of the stems. The stems cannot be too thick. With increasing stem thickness, the density of stems obtainable necessarily decreases. The smaller the number of stems available to act as hooks as part of a hook and loop attachment system, the lower the "holding power" of the plate and the carpet with which it is partnered. Further, of course, the stems and their enlarged heads must be appropriately sized in order for the loops of the attachment system to pass over the stem head so as to be gripped thereby.

In terms of the present invention, it is believed that the maximum workable thickness of a stem is in the neighborhood of about 0.9 mm to 1 mm and that stems for creation of hooked- (or mushroom-headed) stems of a typical height of a hook and loop attachment system, say between 0.5 mm to about 1.5 mm, but more likely about 1 mm, can be manufactured with a plastic flow front rate of about 100 mm per second. This rate would likely work for a plate in which the flat portion from which the stems extend is about 24"×24" and about 3.4 mm thick, is made of polypropylene having a melting temperature of about 160° C., and the molten plastic temperature is about 280° C. Of course, higher flow front rates would also be acceptable.

In the case of the disclosed embodiment in which stems have an average diameter of about 0.55 mm and a height of about 1 mm prior to being deformed to have enlarged heads, the minimum acceptable flow front rate is thought to be closer to about 150 mm per second.

In an alternative embodiment, co-injection of two materials is used to make the hook plate. In co-injection, an amount of a first material (such as pure polypropylene) is first injected into mold 50. Next, a second molten material (such as a mixture of polypropylene and filler) is injected and positioned in the middle portion of body 60. The first material will become the "skin" of the molded piece and specifically the stems in cavities 54 will be made of the first material.

Alternatively, co-injection may occur as described above, but the first material is a plastic with filler (such as polypropylene with talcum) and the second molten material is a different plastic or plastic and filler combination (such as foamed polypropylene or regrind polypropylene).

The use of a filler in the second material will reduce the shrinkage of the material in body 60 in the direction of arrows A, allowing the plastic to cool in the mold 50 for a longer time without shearing the stems sitting in array of cavities 54. The filler may be mineral filler (calcium carbonate, talcum etc.), polypropylene with a foaming agent, regrind polypropylene, glass (beads, fibres), carbon (carbon black or graphite), barium sulphate, or one of a number of known fillers. Fillers are primarily used and selected to reduce material costs. Note that the use of different materials, including fillers, will have an effect on the stiffness of the injection molded piece.

Once the hook plate is removed from the mold, it is allowed to passively cool to room temperature. This step is not necessary if the subsequent coining parameters are adjusted to compensate. When removed from the mold as described above, the hook plate will have a surface temperature of approximately 60° C. No special steps need be taken during this cooling, although cooling conditions that will lead to warpage of the hook plate should be avoided. Accordingly, the hook plate may be placed on a flat mat.

Figure 4:
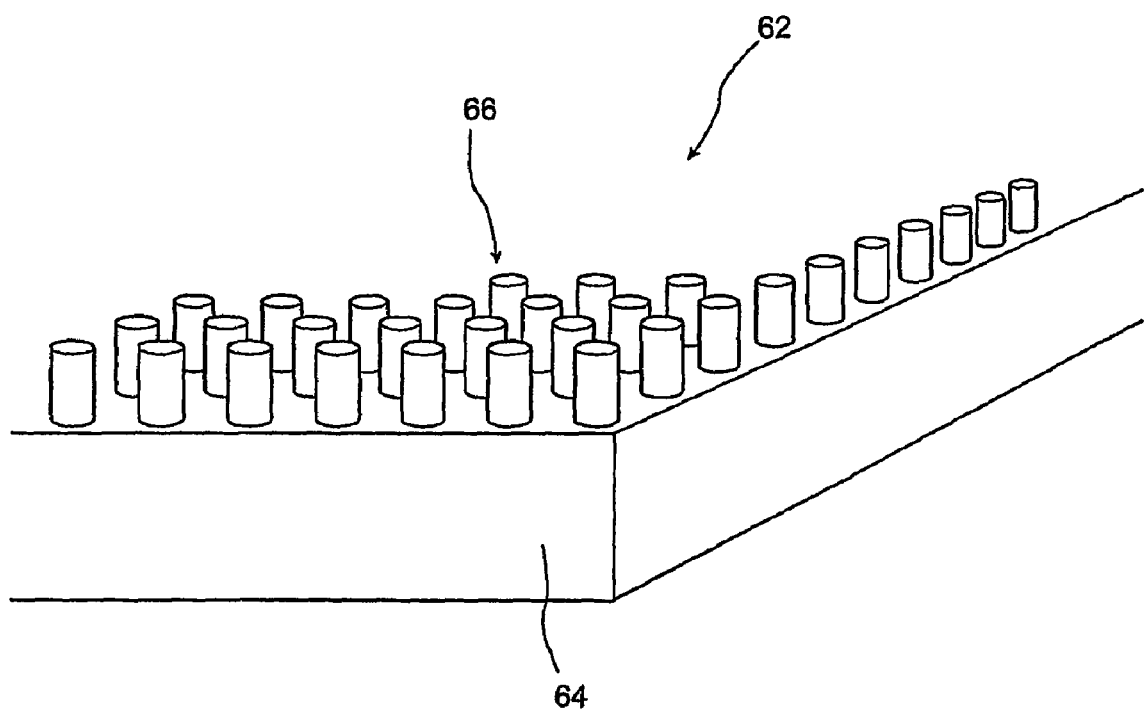
FIG. 4 is a perspective view of a hook plate with an upstanding array of uncoined stems produced using the injection process of FIG. 3.
Figure 4A:
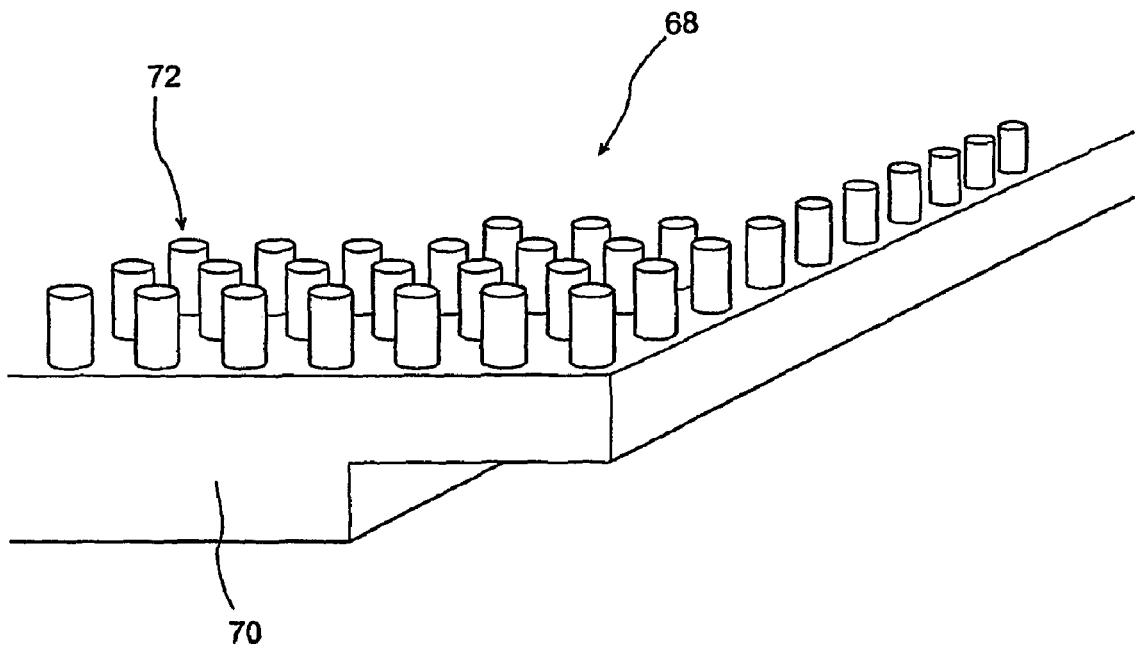
FIG. 4a is a perspective view of a hook plate with an upstanding array of uncoined stems where the hook plate is of different thicknesses in different sections produced using the injection process of FIG. 3.
Figure 4B:
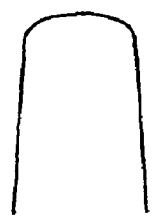

An example of a hook plate 62 with a plate 64 and an array of stems 66 is shown in FIG. 4. Alternatively, the hook plate may be designed to have sections of the plate of different design thicknesses, such as hook plate 68 with a plate 70 and an array of stems 72 as shown in FIG. 4a. A typical stem from array of stems 66 or 72 is shown in FIG. 4b.

The system coins the array of stems 66 or 72 into an array of mushroom-headed hooks by engaging a heated coining plate onto the top of the array of stems 66 or 72, imparting energy thereto and melting (or softening) the tops of the stems and deforming them into a mushroom-head shape, the deformed head overhanging the lower part of the stem on which it is formed, and typically having a diameter greater than that of the stem. In the embodiment, the coining plate is engaged by lowering it onto the tops. Alternatively, the hook plate may be raised to the coining plate or both sections may be moved together.

Figure 5:
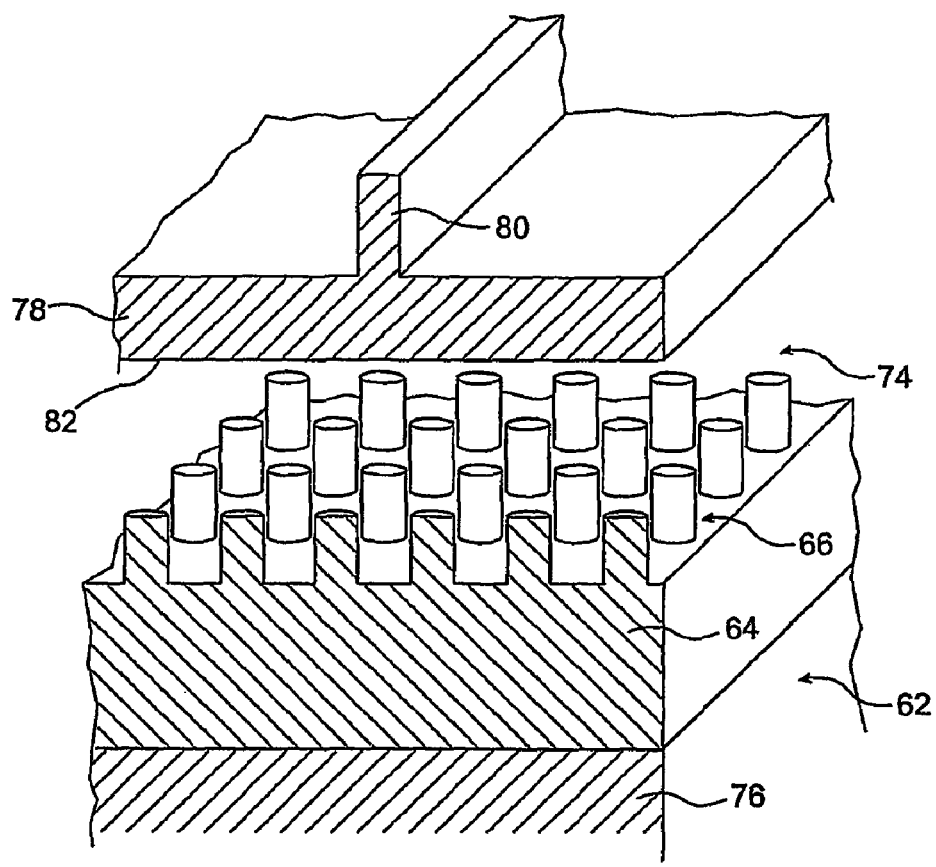
FIG. 5 is a perspective view of a coining station used in the process of FIG. 1 with the hook plate of FIG. 4 in the coining station.

FIG. 5 shows work-piece 62 in a coining station 74. Work-piece 62 lies on a firm support 76. Coining station 74 has a coining plate 78 positioned above firm support 76, with a means for raising and lowering the coining plate 80 and a coining surface 82. The coining plate is made of steel, and is heated electrically. The contact surface of the coining plate is relatively flat and smooth, having no substantial designed cavities therein for forming the heads. Alternative but not preferred coining plates may have cavities therein. The cavities in these alternative coining plates may be used to form the heads of the stems. In such a case, the forming sheet may need to be structured to accommodate the cavities.

Figure 6:
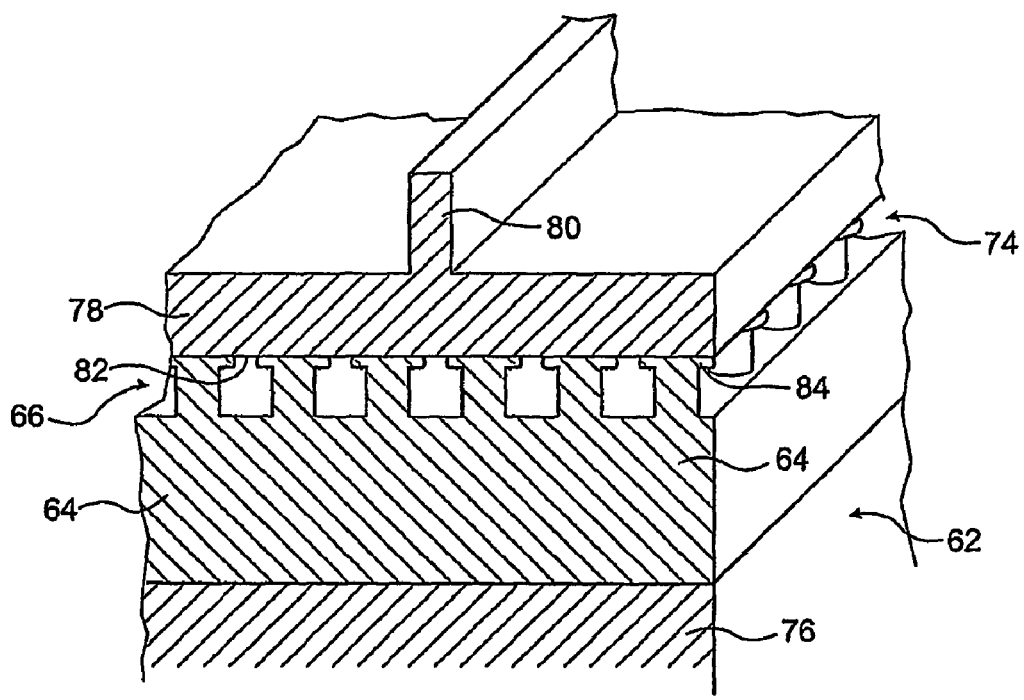
FIG. 6 is a perspective view of the coining station of FIG. 5 coining the hook plate of FIG. 4.

FIG. 6 shows coining station 74 in operation to coin mushroom-shaped heads on the array of stems 66. Coining plate 78 is heated above the melting temperature of the material of array of stems 66, and is then lowered so coining surface 82 engages the top of array of stems 66. This causes the plastic in tops of stems 66 to become molten and deform, creating an array of mushroom heads 84. In a preferred embodiment, the coining distance is 0.3 mm.

The coining method described with reference to FIGS. 5 and 6 has the advantage of being simple in concept. Furthermore, for the molding of a hook plate with a large number of small hooks, flat-plate coining is highly practical and preferred, as other methods (such as coining with a coining plate with a plurality of cavities to receive and mold stems) may require precise alignment between the stems in the array of stems and the cavities in the molding apparatus.

Due to the small size of the stems to be coined relative to the size and thickness of the hook plate, it is important that the coining distance (i.e. the distance down from the top of the stem that the coining plate traverses when creating the hook heads) be similar if not equal for all stems to form similar hook heads. Irregularities can arise from at least three sources: (1) if the rigid support 76 and coining surface 82 of the coining plate are not parallel, so the top of the array of stems 66 is also not parallel to the coining surface 82 (referring to FIGS. 5 and 6); (2) if the hook plate by design has sections of different thicknesses; and (3) if the hook plate has areas of different thicknesses due to variations introduced in the molding process.

In the coining method illustrated in FIGS. 5 and 6, there may be a tendency of having the coined heads of the stems adhere to the coining plate, as the heads may still be semi molten and have sufficient surface tension or other forces causing the adhesion, particularly where the size of the array of stems is large and/or the density of stems (often expressed as stems/square inch) is large. Since the mushroom heads 84 are in a molten state immediately after forming the heads, the mushroom heads 84 may stick to the coining surface 82 of coining plate 78, and accordingly the heads may be damaged or even completely detached as the hook plate is separated from the coining plate 78. Although a solution may be to allow the temperature of the hooks to cool before raising the coining plate, this delay is inefficient vis-à-vis manufacturing throughput. Furthermore, cooling the hooks before separating the coining plate will require that the coining plate be alternately heated and cooled, increasing the cycle time to coin each hook plate, and incurring greater energy costs (and possibly control costs) for controlling the heating of the coining plate. Finally, at the temperatures that might typically be used in this coining process (and specifically at the temperatures used in the preferred embodiment), mold-release sprays cannot be used effectively as the polypropylene material will be in a near-liquid state and will adhere regardless of the use of a mold-release spray.

Figure 7:
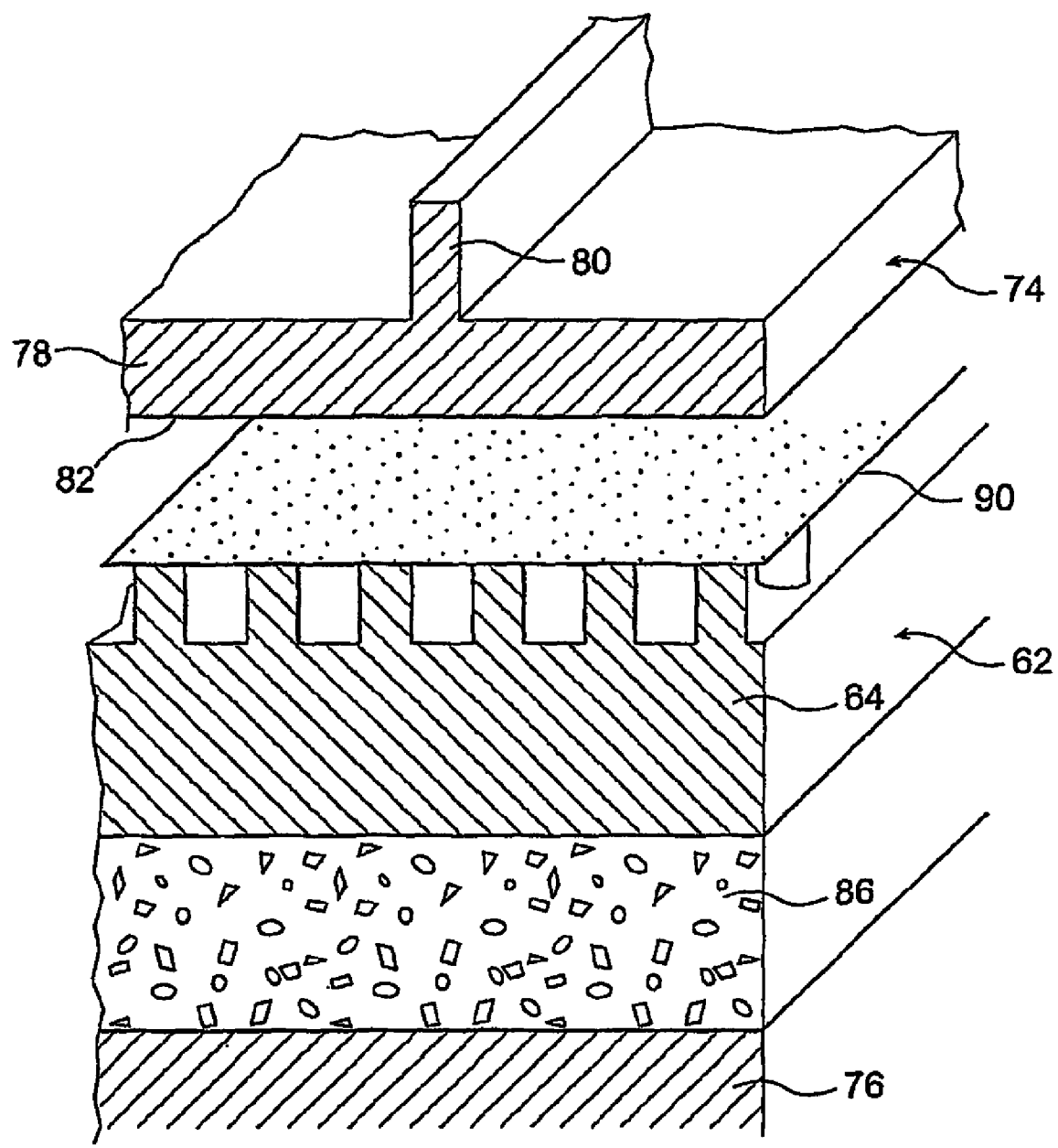
FIG. 7 is a perspective view of the coining station of FIG. 5 with the hook plate of FIG. 4 in the coining station with a resilient layer and a forming sheet.
Figure 8:
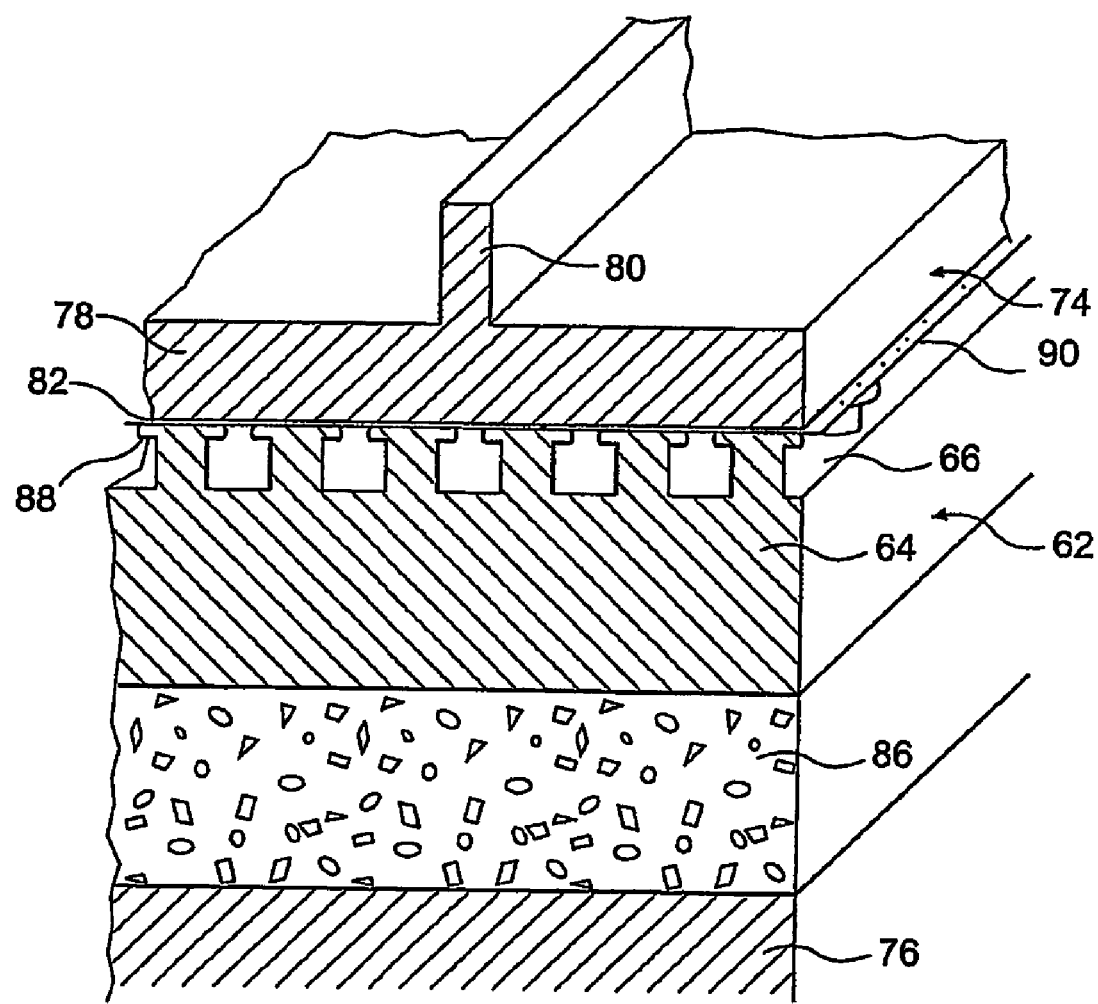
FIG. 8 is a side view of the coining station of FIG. 5 with the resilient layer and the forming sheet of FIG. 7 coining the hook plate of FIG. 4.

FIG. 7 shows a coining station similar to that shows in FIGS. 5 and 6, and like parts are given like numbers. Placed between the plate 64 of the work-piece and rigid support 76 is a compressible resilient piece or layer 86. Resilient layer 86 may be formed as a sheet. The resilient layer 86 may be made of any resilient material that is more resilient and compressible than the material of the work-piece being coined. A 10 mm thick layer of soft polyethylene foam (density of 2 lb per cubic foot) has been found to be suitable for use as a resilient layer. A layer of silicon foam, which lessens the chance of accidentally melting the resilient layer, could be used. It will be appreciated that the stiffer the foam, the greater its thickness should be to achieve the result desired according to the invention. Accordingly the resilient layer provides a cushioning effect underneath hook plate 62. Turning to FIG. 8, the coining plate 78 is heated above the melting temperature of the materials of array of stems 66, and is applied to the top of array of stems 66. Initially the downward force of the coining plate and the heat transfer is not sufficient to significantly cause the stem heads to deform as the resilient layer 86 begins to compress, until the elastic resistance of resilient layer 86 and the heat transfer are sufficient to alter the shape of the stem 66 heads, thereby causing the stems to form an array of mushroom heads 88. The use of resilient layer 86 lessens any effect which might be caused by the rigid support 76 and coining surface 82 of the coining plate not being parallel. Resilient layer 86 also fills any voids in the lower surface of the hook plate 62. Accordingly, heads of stems 66 along the surface of hook plate 62 will generally contact the coining plate before the melting point of polypropylene is reached. This causes the stems to form the heads at substantially the same time, thereby producing hooks for the hook plate. These mushroom heads 88 will be more uniform than mushroom heads 84 when coined as shown in FIGS. 5 and 6.

While the use of a resilient layer 86 is preferred, particularly when heat is used and relatively large work pieces are employed (such as hook plate 62), it is believed that a resilient layer may also be useful in conventional coining processes.

Figure 9:
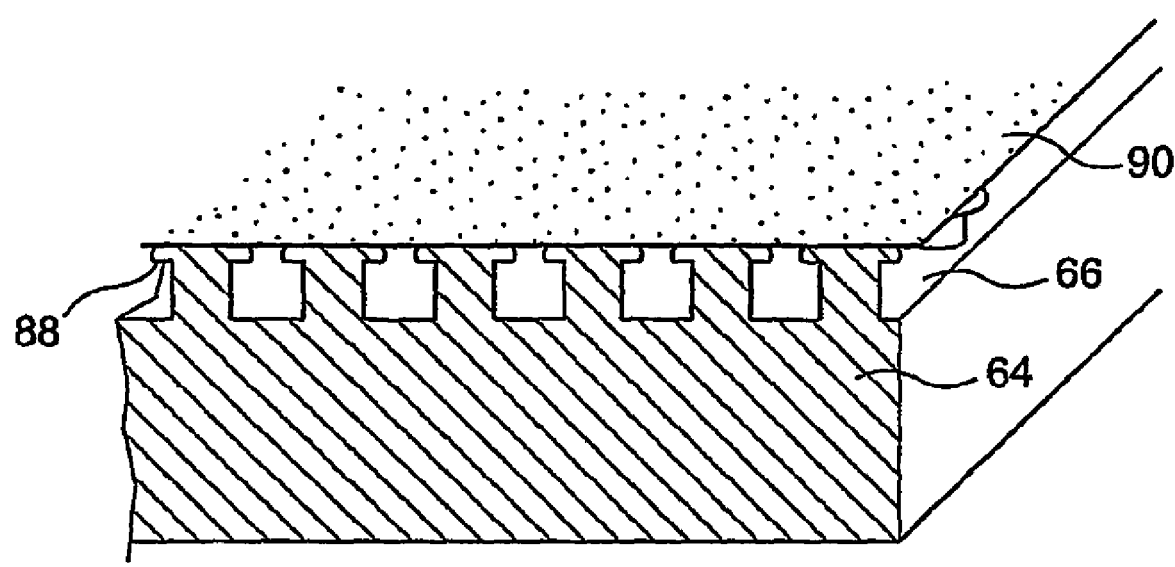
FIG. 9 is a perspective view of the hook plate of FIG. 4 after coining by the coining station of FIG. 5 with the resilient layer and the forming sheet of FIG. 7 with the sheet in place.
Figure 10:
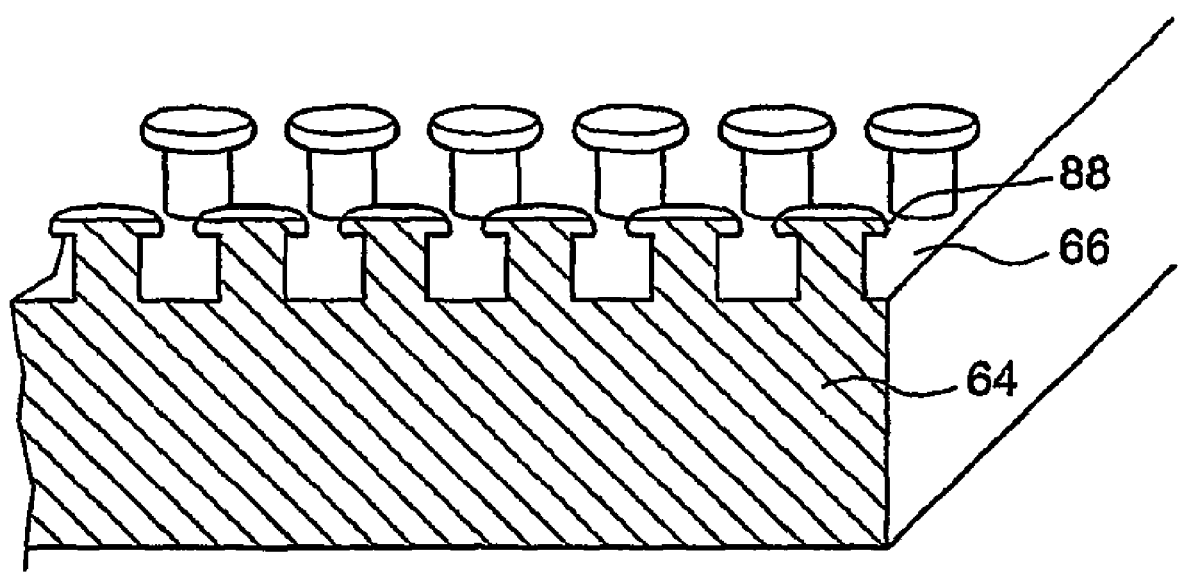
FIG. 10 is a perspective view of the hook plate of FIG. 4 after coining by the coining station of FIG. 5 with the resilient layer and the forming sheet of FIG. 7 with the sheet removed.

Problems which may be caused by sticking of the coining plate to the hooks may be addressed by interposing a forming sheet 90 between the top of array of stems 66 and coining surface 82 of coining plate 78. Coining plate 78 is heated above the melting temperature of the material of that is used to form stems 66, and coining plate 78 is then pressed down upon the top of the array of stems 66, creating heads 88. Molten heads 88 will not contact coining surface 82 due to the presence of forming sheet 90. Molten heads 88 may stick to the underside of sheet 90. Hook plate 62 may be removed from coining device 74, and as shown in FIG. 9, allowed to cool with sheet 90 still attached to heads 88. Once heads 88 have cooled to below the melting temperature of the plastic, sheet 90 may be removed, leaving hook plate 62 as shown in FIG. 10 with a plurality of stems 66 bearing heads 88.

Figure 10A:
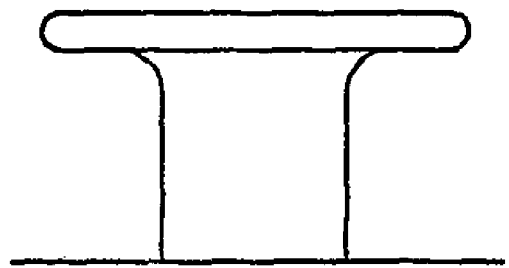
FIG. 10a is a perspective view of a mushroom-shaped hook head on a hook plate of FIG. 4 as formed by a coining method of the embodiment.

Forming sheet 90 also provides mechanical support for the stems, as the flat contact surface of the sheet creates the flat top portion of the heads, thereby creating hook heads with a relatively flat upper surface as shown in FIG. 10a. Sometimes in this draft the expression "mushroom head" or "mushroom shape" is used. The heads can be in the form of traditional mushrooms but more often they are flat on top as shown in FIG. 10a. The expressions "mushroom head" and "mushroom shaped" are meant to encompass all of the various forms of heads with a stem and a radially longer end or distal portion, which form a "latch" to which loops can attach.

In the preferred embodiment, a non-woven, spun web of polyester with nylon is used as a forming sheet 90. Forming sheet 90 may also be made of some other material that has limited shrinkage as it cools, and that does not melt during the manufacturing process, such as a fibre-reinforced Teflon™ sheet. Using forming sheet 90, the cooling time for the sheet on the hooks without the coining plate (as shown in FIG. 9) is approximately 2-5 seconds. Plastic sheets, steel sheets, aluminum sheets, and paper sheets have also been used satisfactorily as a forming sheet.

When coining, one design parameter is the temperature of the coining plate 78 during coining (also called the coining temperature) and the amount of time the coining plate 78 is pressed down on the top of array of stems 66 (also called the coining time). For the preferred embodiment, the following data have been found for the relationship between the coining temperature and the coining time:

| Coining Time | Coining Temperature |
|---|---|
| 5.0 s | 165° C. |
| 2.0 s | 170° C. |
| 1.0 s | 175° C. |
| 0.9 s | 180° C. |

Figure 11:
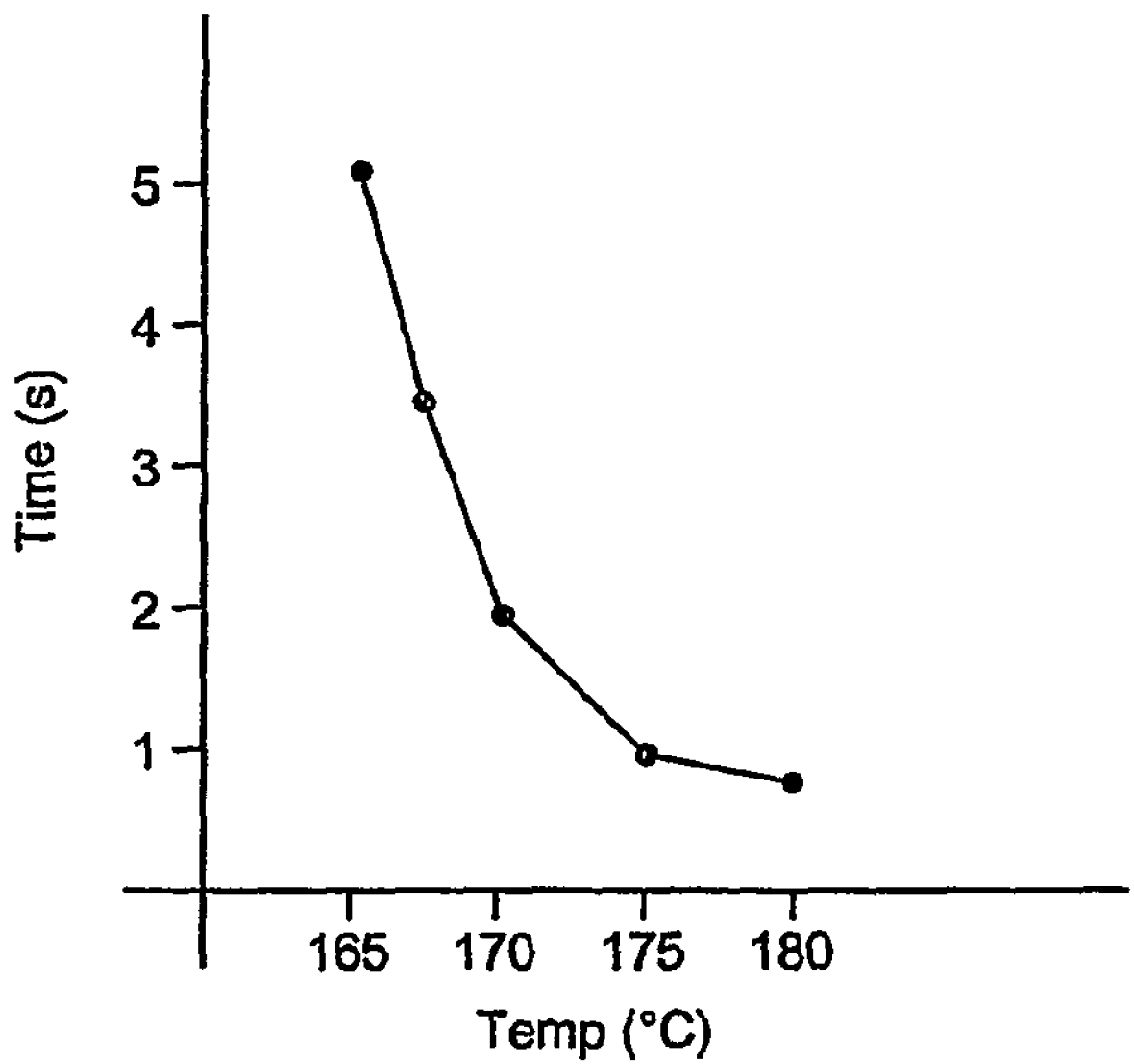
FIG. 11 is a chart of coining time(s) versus coining temperature (° C.) for the preferred embodiment.

This data is charted in FIG. 11. For a given material, the coining time and temperature are related in a non-linear relationship: the higher the coining temperature, the less the necessary coining time. However, FIG. 11 shows that the gain in coining time for higher temperatures for the preferred embodiment decreases rapidly beyond a coining temperature of 175° C., while lowering the temperature beyond 170° C. rapidly leads to increasingly longer necessary coining times. While having a lower coining time is beneficial as more hook sheets can be coined in a given amount of time, it is also beneficial to have a lower coining temperature to obtain more uniform hook heads.

A coining or forming sheet of glass fiber reinforced teflon having a thickness of between 0.125 mm and 0.25 mm has been found to be suitable for use according to the invention. Paper suitably treated for use at the temperatures of the coining step could be used. It is expected that with the use of thinner coining sheets, the effective range of coining times could be lowered to around 0.5 s.

Figure 12:
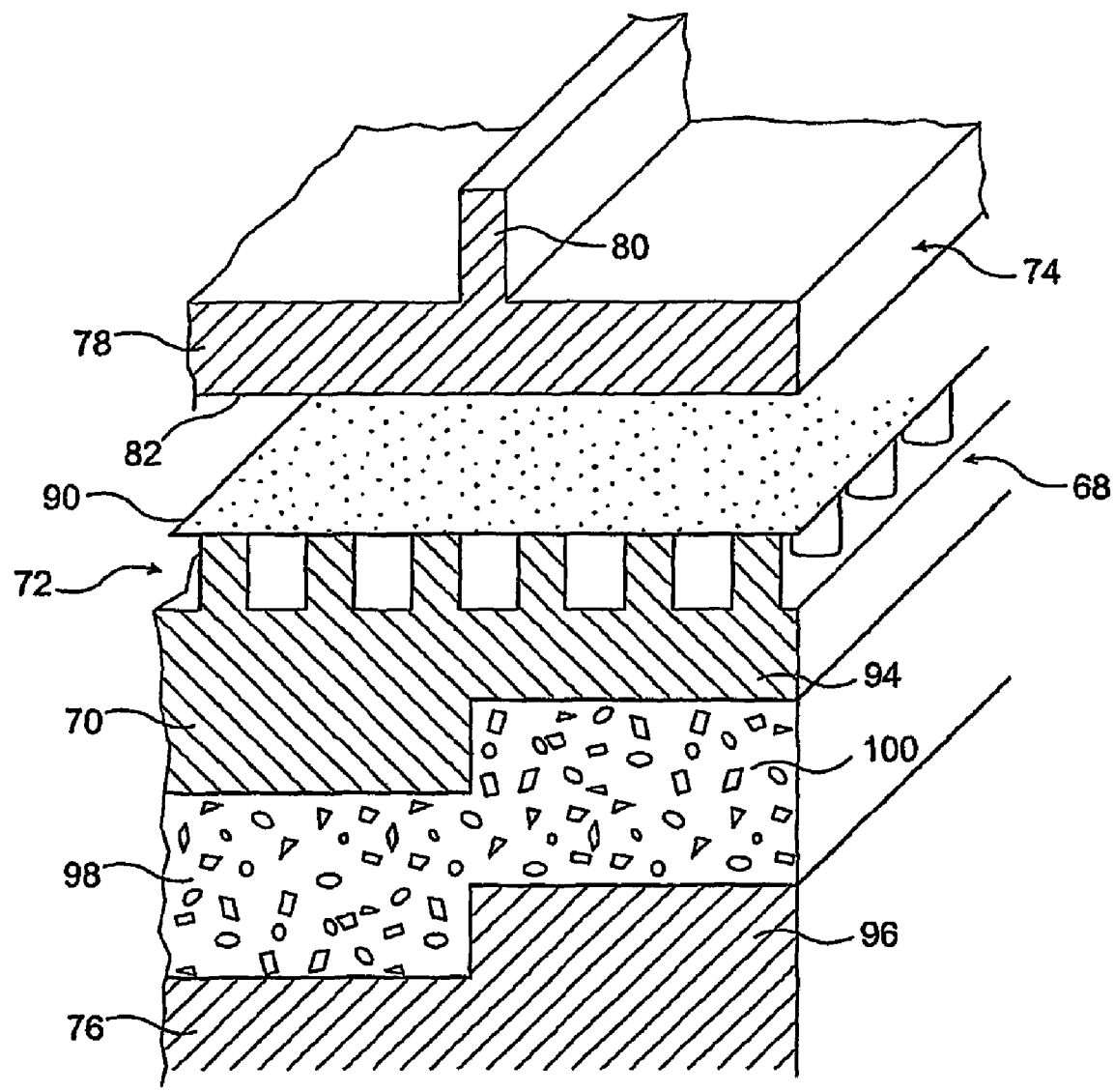
FIG. 12 is a perspective view of the coining station of FIG. 5 with the hook plate of FIG. 4a in the coining station with the resilient layer and the forming sheet.

This system can also be used with a hook plate that has sections of varying thicknesses. FIG. 12 shows a hook plate 68 in a coining station 74 which is similar to the hook plate and coining station of FIGS. 4a and 5 respectively, and where like parts have been given like numbers. Hook plate 68 has a thicker base 70 with a thinner base section 94 which is thinner than base 70. Base section 94 will therefore be stiffer in the coining direction than thicker base 70 during coining. To accommodate this, firm support 76 has a correspondingly raised section 96. Similarly, resilient layer 98 has a correspondingly raised and supported resilient section 100. Resilient layer 98 and higher resilient section 100 may be one piece of resilient material, or two pieces.

Figure 12A:
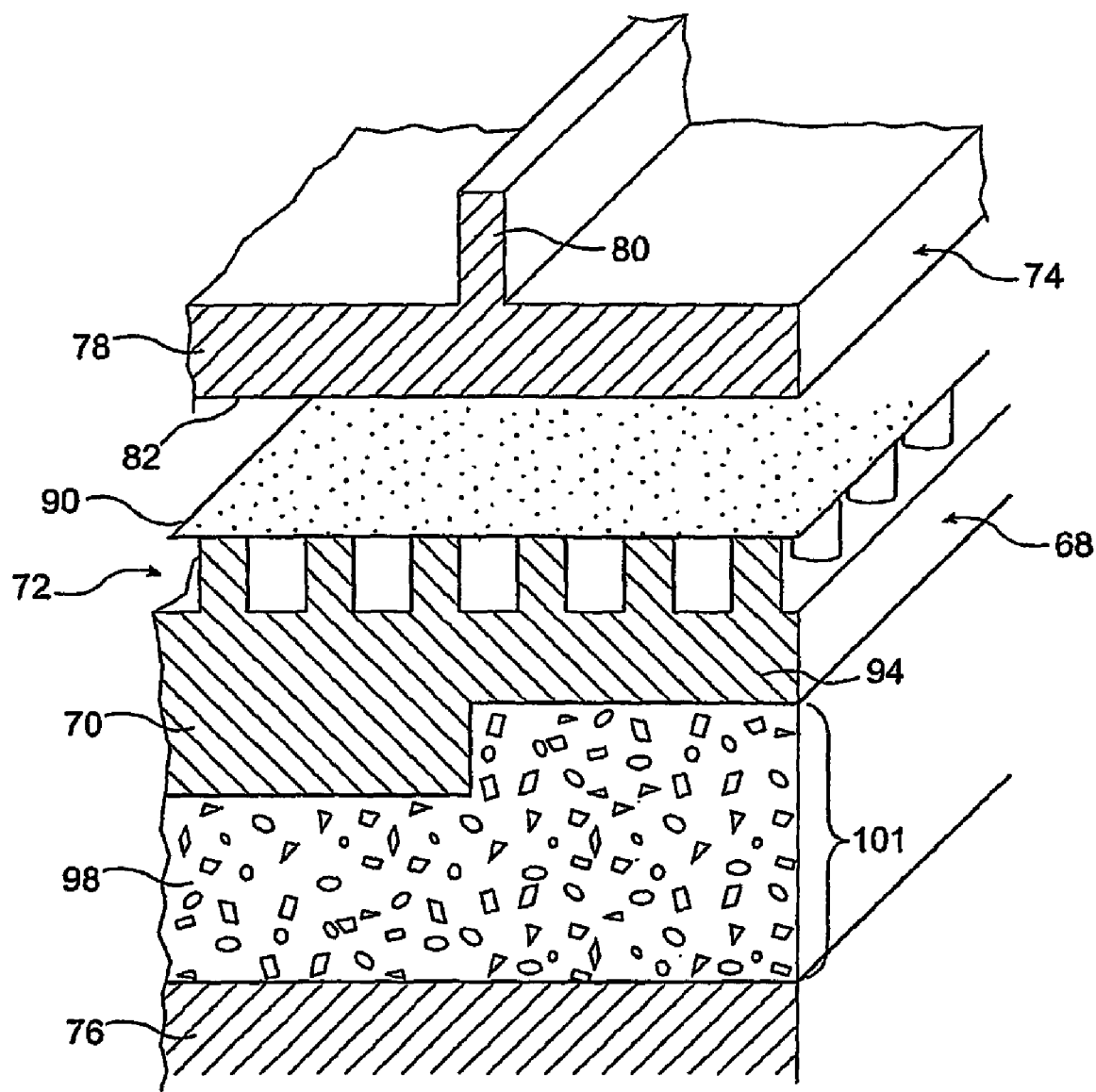
FIG. 12a is a is a perspective view of the coining station of FIG. 5 with the hook plate of FIG. 4a in the coining station with an alternative resilient layer and the forming sheet.

Alternatively, a system such as that pictured in FIG. 12a may be used. FIG. 12a is similar to FIG. 12, and like parts have been given like numbers. Hook plate 68 has a thicker base 70 with a thinner base section 94 which is thinner than base 70. The resilient layer 98 has a correspondingly thicker section 101. Resilient layer 98 and thicker resilient section 101 may be one piece of resilient material, or two pieces.

Figure 13:
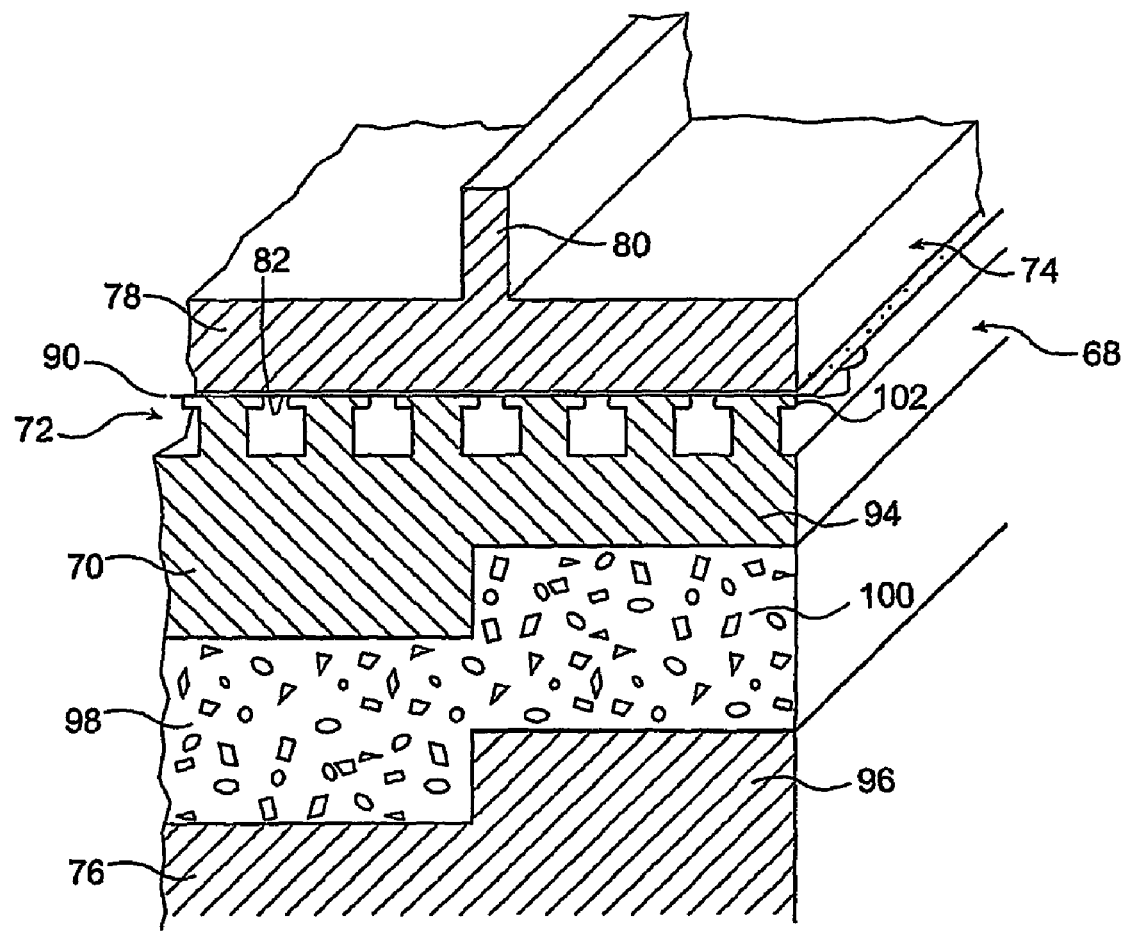

Turning to FIG. 13, the coining plate 78 is heated above the melting temperature of the materials of array of stems 72, and engages sheet 90 which in turn engages the top of array of stems 72. The resilient layers 98 and section 100 begins to compress, until the elastic resistance of resilient layer 98 or section 100 under stems 72 becomes great enough in combination with heat transfer to the stems to compromise the integrity of the heads of the stems, causing the heads of the stems to deform into mushroom shaped hook heads 102. The use of resilient layers 98 and section 100 mitigates the effects of bases 70 and 94 being of different thicknesses, so mushroom shaped hook heads 102 will be of greater uniformity in terms of head size and height from the hook plate.

Figure 14:
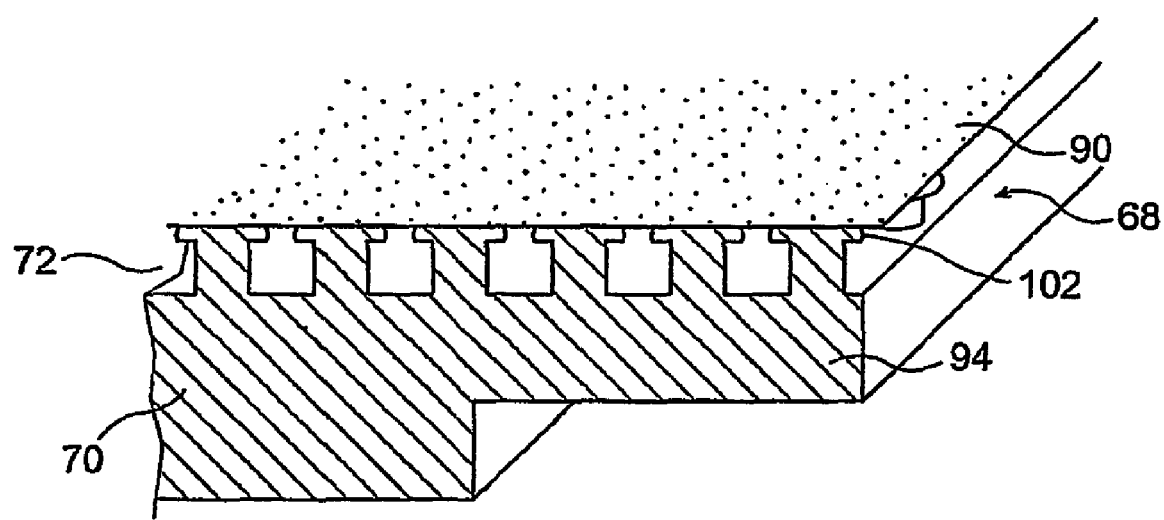
FIG. 14 is a perspective view of the work-piece of FIG. 4a after coining by the coining station of FIG. 5 with a resilient layer and a forming sheet of FIG. 12 with the sheet still in place.
Figure 15:
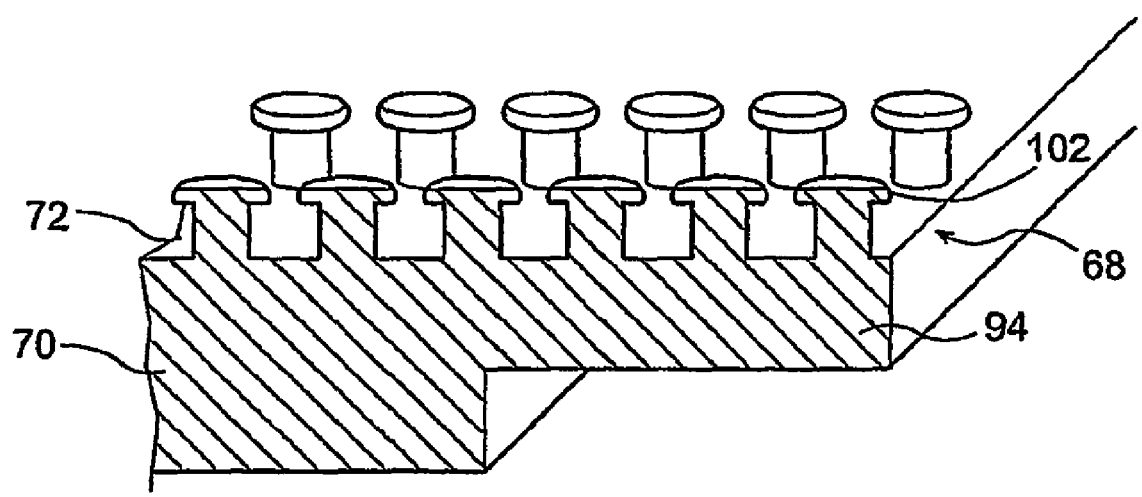
FIG. 15 is a perspective view of the hook plate of FIG. 4a after coining by the coining station of FIG. 5 with the resilient layer and the forming sheet of FIG. 12 with the sheet removed.

It will be appreciated that different materials for the resilient layer having differing compression and resilience properties will provide differing degrees of support to the hook plate during coining. Similarly described to the process relating to FIGS. 9 and 10, hook plate 68 is allowed to cool with forming sheet 90 attached to mushroom shaped hook heads 102 in FIG. 14, and forming sheet 90 is removed to leave a finished hook plate 68 in FIG. 15.

In the preferred embodiment, the thickness of base 70 is ⅛" (3.175 mm), and the thickness of base section 94 is ¹⁄₁₆" (1.5875 mm). It will be readily appreciated that other dimensions for the hook plate may be used.

The use of a resilient layer during coining also compensates for manufacturing and process tolerance issues. Variations within the tolerances within a large work-piece arise from at least the following sources:
- uneven pressure distribution during injection molding over the part causing uneven filling and shrinkage rates;
- gradual deformation of the mold;
- non-parallel mold parts during molding;
- variations in the thickness of the walls of the mold from the mold manufacturing process itself;
- different shrinkage due to different temperatures across the mold during the molding process;
- process-induced differences in material properties due to material shearing and degradation; and
- varying raw material properties, such as if the raw material consists of a mixture of pellets of different raw material production lots.

In small injection-molded pieces, tolerances in precision molding can be within +/−0.02 mm for a part with a thickness of 3.5 mm. However, such precision molding is not practical for large parts, especially when the large parts are to be made in large quantities. The technology of precision molding requires several costly manufacturing conditions, such as very high pressures, mold adjustment to relevant sensor readings, and the use of technical polymers with constant and controlled properties, making precision molding more costly than less precise manufacturing processes. Accordingly, using precise molding for mass producing a hook plate with a large dimension is uneconomically expensive.

Figure 16:
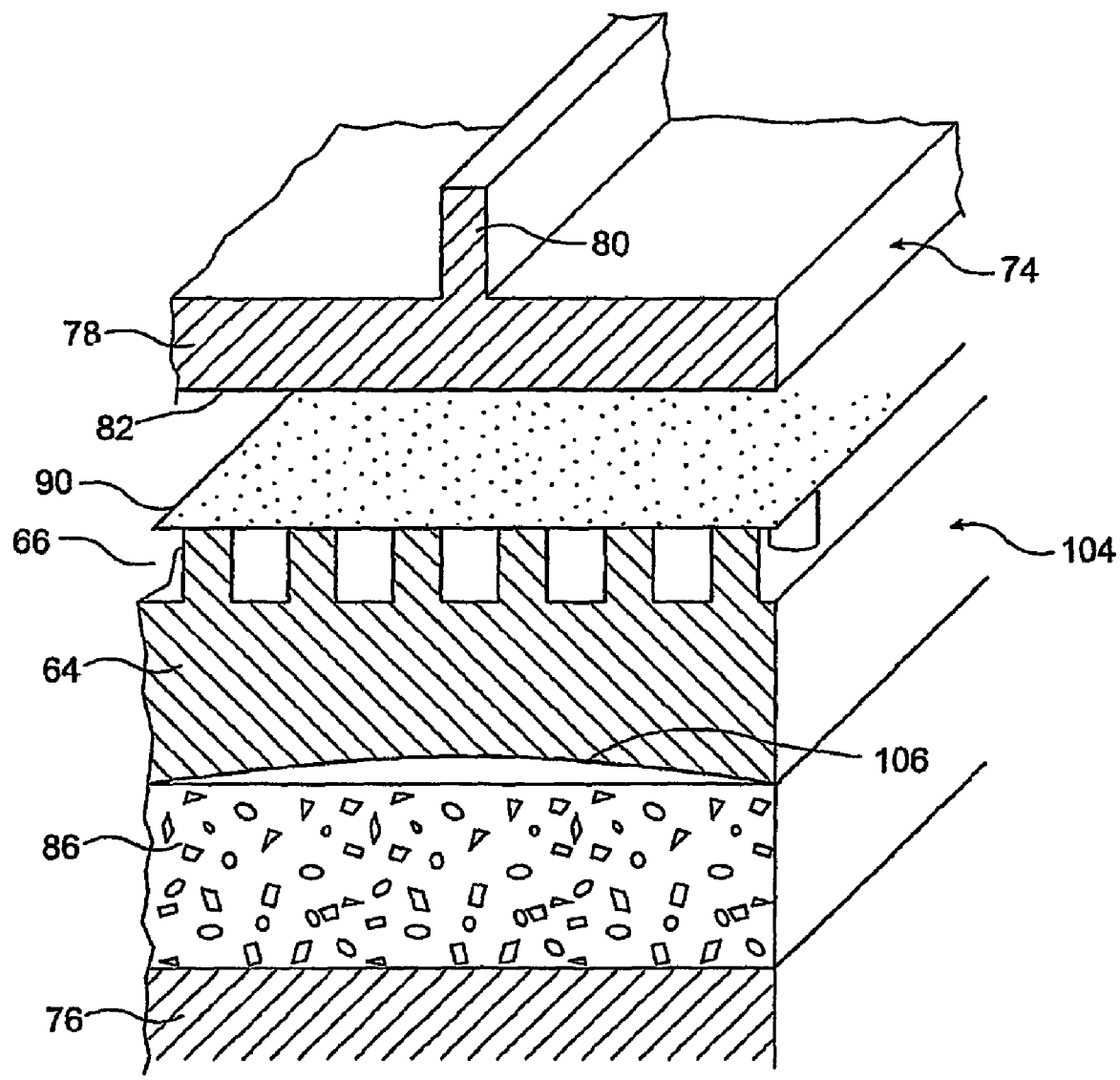
FIG. 16 is a perspective view of the coining station of FIG. 5 with a hook plate produced by the injection application of FIG. 2 and having a non-uniformly shaped bottom, with a resilient layer and a forming sheet.

FIG. 16 shows a hook plate 104 in a coining station 74 which is similar to the hook plate and coining station of FIGS. 4 and 5, and where like parts have been given like numbers. Hook plate 104 has a manufacturing variance 106 as a concave void in plate 64.

Figure 17:
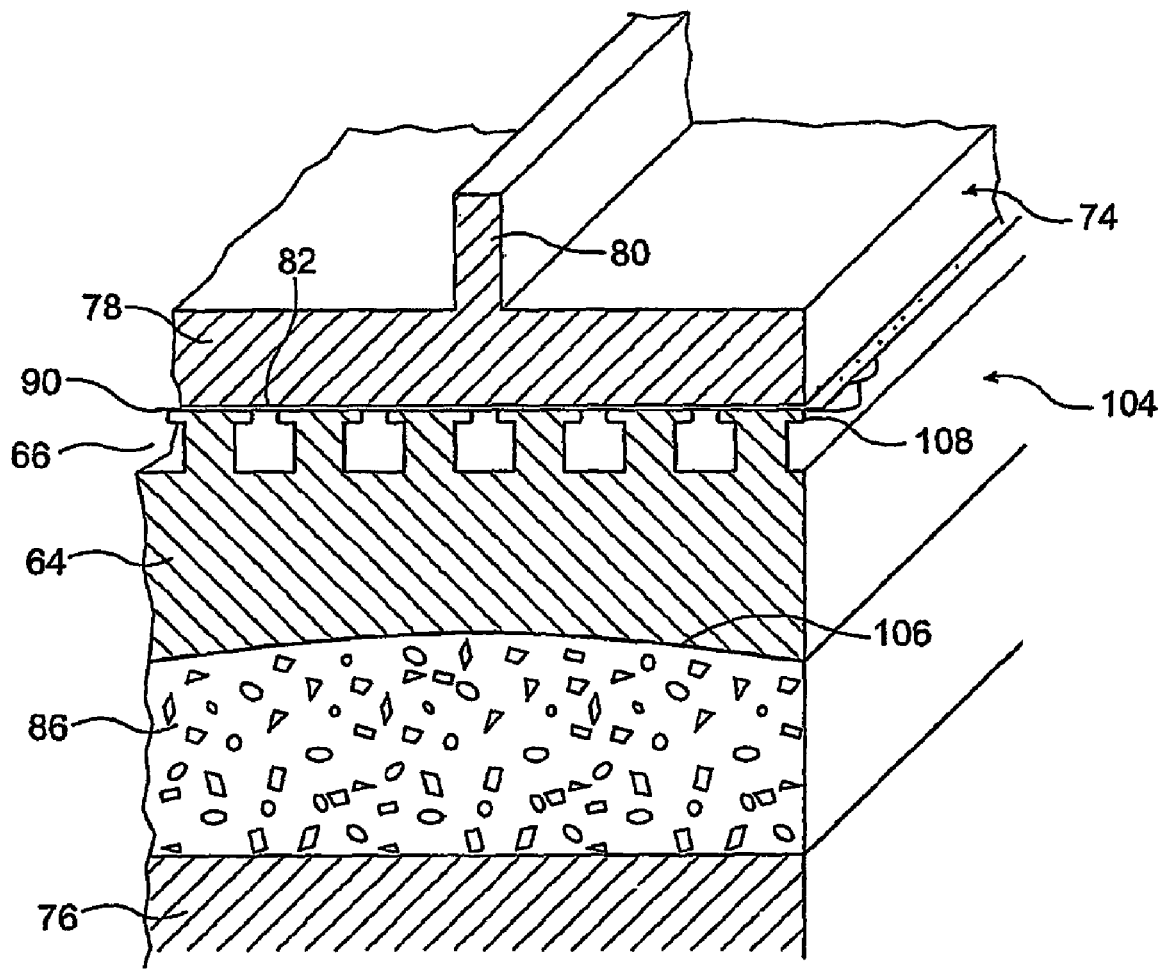
FIG. 17 is a perspective view of the coining station of FIG. 5 with the resilient layer and the forming sheet of FIG. 7 coining a hook plate produced by the injection apparatus of FIG. 2 and having a non-uniformly shaped bottom.

Turning to FIG. 17, the coining plate 78 is heated above the melting temperature of the materials of array of stems 66, and engages sheet 90 which in turn engages the top of array of stems 66. The resilient layer 86 begins to compress, until the elastic resistance of resilient layer 86 under stems 66 becomes great enough with the heat transfer to the heads of stems 66 to cause the heads of stems 66 to deform and so produce an array of mushroom hook heads 108. Note that resilient layer 86 now fills the area of variance 106 providing support to the hook sheet above the defect. Accordingly the area along the hook sheet is supported and the hooks therein are subject to a similar compression force as the force to which neighbouring hooks are subjected in areas away from variance 106. The use of resilient layers 86 thus mitigates the effects of variance 106 so mushroom hook heads 108 will be of greater uniformity.

Figure 18:
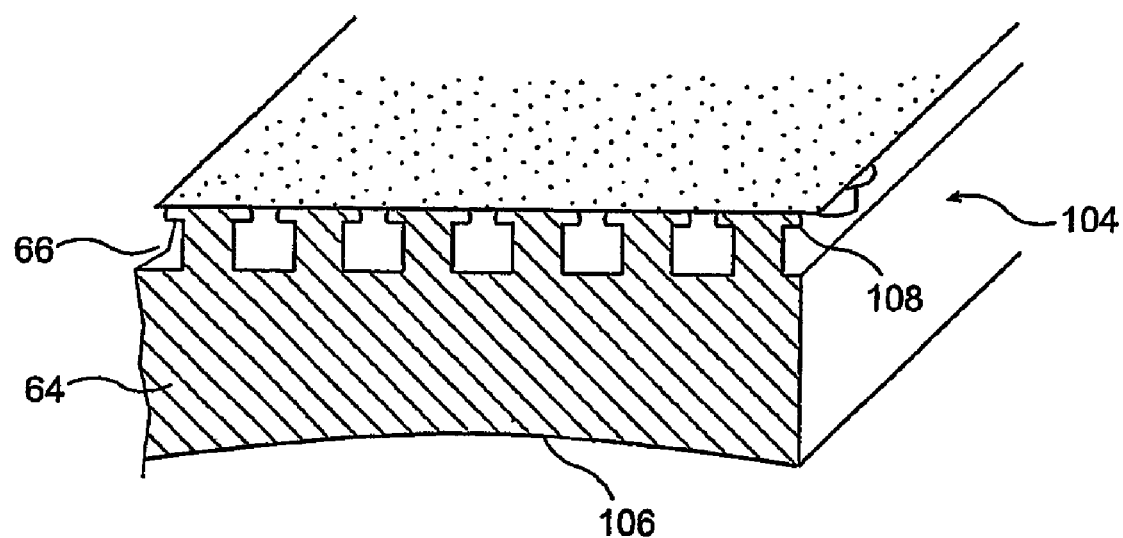
FIG. 18 is a perspective view of the hook plate produced by the injection apparatus of FIG. 2 and having a non-uniformly shaped bottom, after coining by the coining station of FIG. 5 with the resilient layer and the forming sheet of FIG. 7 with the sheet in place.
Figure 19:
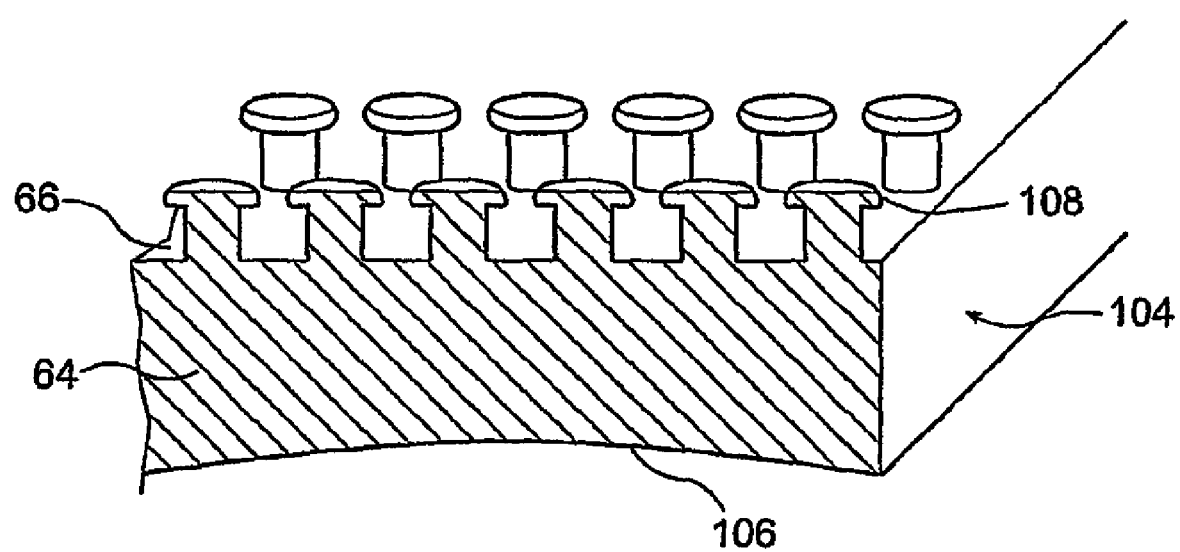
FIG. 19 is a side view of a hook plate produced by the injection apparatus of FIG. 2 and having a non-uniformly shaped bottom, after coining by the coining station of FIG. 5 with the resilient layer and the forming sheet of FIG. 7 with the sheet removed.

Similar to the process described with reference to FIGS. 9 and 10, hook plate 104 is allowed to cool with forming sheet 90 attached to mushroom hook heads 108 in FIG. 18, and forming sheet 90 is removed to leave a finished hook plate 104 in FIG. 19.

Figure 20:
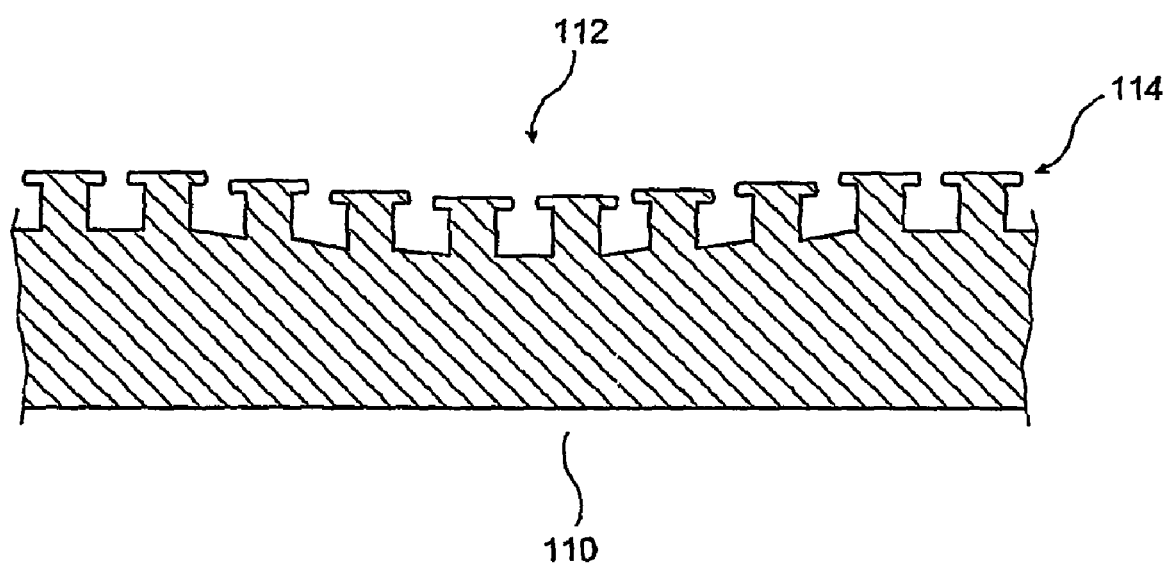
FIG. 20 is a side view of a hook plate produced by the injection apparatus of FIG. 2 and having variance in its top surface, after coining by the coining station of FIG. 5 with the resilient layer and the forming sheet of FIG. 7 with the sheet removed.

Variations may occur elsewhere than on the bottom of a hook plate. For example, FIG. 20 shows a coined hook plate 110 with a variance 112 on the top surface. The use of a resilient layer will mitigate the effects of variance 112, making hook heads 114 of a more uniform size.

Generally, such variances will be gradual and broad as opposed to sharp deviations such as sink marks. (Note that for ease of explanation, variance 106 in FIGS. 16-19 is drawn as much more abrupt than would appear in practice in a reasonably properly manufactured piece) The resilient layer will act to mitigate the effects of manufacturing variances in a reasonably properly manufactured piece, which implies that the manufacturing variances are gradual rather than abrupt sink marks. If the manufacturing variances in the hook plate are severe enough, the ability of the resilient layer to mitigate these effects will be diminished or negligible.

All documents mentioned in this description are incorporated herein by reference as though their entire contents were reproduced herein. Further, Applicant reserves the right to incorporate any part of any document mentioned herein into this specification for at least as long as the application is pending.

The scope of protection sought for any invention described herein is defined by the claims which follow. It will be appreciated by those skilled in the art that a variety of possible combinations and subcombinations of the various elements described herein exist, and all of these combinations and subcombinations should be considered to be within the inventor's contemplation though not explicitly enumerated here. This is also true of the variety of aspects of the processes and the combinations and subcombinations of elements thereof.

The invention claimed is:

1. A process for forming shaped heads on distal ends of stems connected at proximal ends to an upper side of a generally flat substrate, the process comprising:
    placing the substrate on top of a compressible resilient sheet; and
    applying heat and pressure to the distal ends of the stems by means of a heated coining surface to cause softening of a portion of the distal ends of the stems and the formation of shaped heads on the distal ends of the stems,
    wherein the substrate includes a plate portion and the resilient sheet is, at room temperature, relatively flexible with respect to the plate portion of the substrate.

2. The process of claim 1 wherein a forming sheet is placed intermediate between the heated coining surface and the distal ends of the stems prior to applying heat and pressure to the distal ends of the stems.

3. The process of claim 2 where the heated coining surface is at a temperature between 165° C. and 180° C. when applied to the distal ends of the stems.

4. The process of claim 3 wherein the heated coining surface is applied to the forming sheet for between 0.9 and 5 seconds.

5. The process of claim 4 wherein the substrate is allowed to cool and the forming sheet is then removed from the distal ends of the stems.

6. The process of claim 3 wherein the heated coining surface is applied to the forming sheet for between 0.5 and 5 seconds.

7. The process of claim 6 wherein the resilient layer is a silicon foam.

8. A forming sheet for use in the process of claim 2, the forming sheet manufactured from one of the following materials: steel; aluminum; paper; fibre reinforced teflon; and teflon.

9. The process of claim 1, further comprising the step of injection-molding the substrate bearing the stems before the step of placing the substrate on top of a resilient sheet.

10. The process of claim 9, wherein the resilient layer is an integral part of the substrate.

11. The process of claim 1, further comprising the step of providing an injection-molded substrate bearing the stems, before the step of placing the substrate on top of a resilient sheet.

12. The process of claim 1, wherein the coining surface is generally flat.

13. The process of claim 1, wherein said stems have a density of up to about 2300 stems per square inch, or between 25 and 2000 stems per square inch, or between about 25 and 1500 stems per square inch, or between about 25 and 1250 stems per square inch, or between about 25 and 1000 stems per square inch, or between about 25 and 800 stems per square inch.

14. The process of claim 13, wherein said density is between about 50 and 400 stems per square inch.

15. The process of claim 1 wherein the substrate includes:
a layer of substantially constant cross section and a thickness in a range of from about 1 to 8 mm; and
the stems extending generally transversely from a major upper surface of the layer, and molded integrally therewith in a single injection-molding step; and wherein:
the stems have a height of less than or equal to about 1.5 mm and a diameter of between about 0.3 mm and 0.9 mm; and
the stems have a density on said upper surface of between 100 and 2300 stems per square inch.

16. A process for manufacturing hooks on a hook plate with an array of upstanding stems, the process comprising:
placing a compressible resilient layer beneath the hook plate; and
applying a heated coining surface against the tops of the array of upstanding stems to create enlarged heads on the upstanding stems,
wherein the hook plate includes a plate portion and the resilient layer is, at room temperature, relatively flexible with respect to the plate portion of the hook plate.

17. The process of claim 16 wherein the resilient layer is made from the same material as the work-piece.

18. A process for manufacturing hooks on a hook plate with an array of upstanding stems, the hook plate having a first area of a first thickness and the hook plate having a second area of a second thickness less than the first thickness, the process comprising:
placing a first resilient piece of a third thickness beneath the first area;
placing a second resilient piece of a fourth thickness beneath the second area; and
applying a heated coining surface against the tops of the array of upstanding stems to create enlarged heads on the upstanding stems.

19. The process of claim 18 wherein the third thickness and the fourth thickness are the same.

20. The process of claim 19 wherein the first resilient piece and the second resilient piece are made from a silicon foam.

21. The process of claim 18 wherein the fourth thickness is greater than the third thickness.

22. The process of claim 20 wherein the first resilient piece is a part of the hook plate.

23. The process of claim 22 wherein the second resilient piece is a part of the hook plate.

24. The process of claim 23 wherein the first resilient piece and second resilient piece are connected.

25. The process of claim 18 wherein the hook plate includes:
a substantially constant cross section in the first area and the first thickness being in a range from about 1 to 8 mm; and
the array of stems extending generally transversely from a major upper surface of the hook plate, and molded integrally therewith in a single injection-molding step; and wherein:
the stems have a height of less than or equal to about 1.5 mm and a diameter of between about 0.3 mm and 0.9 mm; and
the stems have a density on said upper surface of between 100 and 2300 stems per square inch.

26. The process of claim 15 or 25 wherein the major upper surface has an area of at least twenty-five square inches.

27. A process for manufacturing hooks on a hook plate with an array of upstanding stems, the process comprising:
applying a heated coining surface against a forming sheet which in turn is located against the tops of the array of upstanding stems to create enlarged heads on tops of the upstanding stems, and wherein the stems are connected at proximal ends thereof to an upper side of a substrate, and said process further comprises the step of placing said substrate on top of a compressible resilient sheet,
wherein the resilient layer is, at room temperature, relatively flexible with respect to the substrate.

28. The process of claim 17, further comprising the step of:
removing the hook plate and forming sheet together from the coining surface,
allowing the work-piece and forming sheet to cool, and removing the forming sheet from the enlarged heads.

29. The process of claim 17 wherein the heated coining surface is at a temperature between 165° C. and 180° C.

30. The process of claim 29 wherein the heated coining surface is applied against the forming sheet for between 0.9 and 5 seconds.

31. The process of claim 29 wherein the heated coining surface is applied against the forming sheet for between 0.5 and 5 seconds.

32. A process for manufacturing hooks on a hook plate with an array of upstanding stems using a coining plate, the process comprising:
inserting a forming sheet between the coining plate and the tops of the array of upstanding stems;
coining the hooks on the tops of the upstanding stems; and
removing the coining plate from contact with the forming sheet,
wherein the forming sheet is made of a non-woven, spun web.

33. A process for manufacturing hooks on a hook plate with an array of upstanding stems, the process comprising:
applying a generally flat heated coining surface against the tops of the array of upstanding stems to create enlarged heads on tops of the upstanding stems, and placing said hook plate on top of a compressible resilient sheet before said step of applying a generally heated coining surface,
wherein the hook plate includes a plate portion and the resilient sheet is, at room temperature, relatively flexible with respect to the plate portion of the hook plate.

34. A process for manufacturing hooks on a hook plate with an array of upstanding stems using a coining plate, the process comprising:

placing said hook plate on top of a compressible resilient sheet; and coining the hooks on the tops of the upstanding stems, wherein the hook plate includes a plate portion and the resilient sheet is, at room temperature, relatively flexible with respect to the plate portion of the hook plate.

35. A method for forming enlarged heads on distal ends of heat-deformable stems of a work piece, the method comprising:

providing a work piece having an upper substantially planar surface from which the stems on which the heads are to be formed extend;

providing a compressible resilient layer dimensioned to underlie the piece and having an upper surface shaped to provide support substantially across an underside of the piece;

positioning the piece and layer in a coining apparatus with the upper surface of the resilient layer positioned to provide said support to the underside of the piece; and pressing a heated surface of the coining apparatus against the distal ends of the stems to form the heads, wherein the planar surface has a base layer and the resilient layer is, at room temperature, relatively flexible with respect to the base layer of the work piece.

36. The method of claim 35, wherein the piece comprises an injection-molded plastic.

37. The method of claim 36, wherein said surface of the coining apparatus is heated to a temperature between the glass transition temperature of the plastic and a temperature 30° C. greater than the melting temperature of the plastic.

38. The method of claim 36, wherein said surface of the coining apparatus is heated so as to provide a temperature to the stems between the melting temperature of the plastic and a temperature 30° C. greater than the melting temperature of the plastic.

39. The method of claim 38, wherein said surface of the coining apparatus is heated so as to provide a temperature to the stems between a temperature 10° C. greater than the melting temperature of the plastic and a temperature 30° C. greater than the melting temperature of the plastic to provide a temperature to the stems about 15° C. greater than the melting temperature of the plastic.

40. The method of any of claim 36, wherein the plastic comprises a thermoplastic selected from the group consisting of polypropylene, polyethylene terephthalate, and nylon.

41. The method of any of claim 35, wherein the stems, prior to formation of the heads extend from said upper planar surface to a height of up to about 1.5 mm and the diameter of the stems is up to about 1 mm.

42. The method of claim 41, wherein said height is between about 0.5 mm and about 1.5 mm, and said diameter is between about 0.1 mm and 1 mm; or wherein said height is between about 0.3 mm and about 1.5 mm, and said diameter is between about 0.3 mm and 0.9 mm; or wherein said height is between about 0.5 mm and about 1.5 mm and said diameter is between about 0.3 mm and 0.9 mm; or said height is between about 0.6 mm and about 1.4 mm, and said diameter is between about 0.35 mm and 0.8 mm; or said height is between about 0.7 mm and about 1.3 mm, and said diameter is between about 0.4 mm and 0.7 mm; or said height is between about 0.8 mm and about 1.2 mm, and said diameter is between about 0.45 mm and 0.65 mm; or said height is between about 0.9 mm and about 1.1 mm, and said diameter is between about 0.5 mm and 0.6 mm.

43. The method of claim 41, wherein the ratio of the height to the diameter is between about 3/1 and 1/1, or between about 2.5/1 and 1.5/1, or is about 2/1.

44. The method of claim 42, wherein said height is about 1 mm and said diameter is about 0.55 mm.

45. The method of any of claim 35, said stems have a density on said upper surface of the piece of up to about 2300 stems per square inch, or between 25 and 2000 stems per square inch, or between about 25 and 1500 stems per square inch, or between about 25 and 1250 stems per square inch, or between about 25 and 1000 stems per square inch, or between about 25 and 800 stems per square inch.

46. The method of claim 45, wherein said density is between about 50 and 400 stems per square inch.

47. The method of any of claim 35, wherein said stems have a density on said upper surface of between about 150 and about 300 stems per square inch, and particularly between about 200 and 250 stems per square inch, and said heads are formed to a size and shape suitable for engagement of loops of a hook and loop fastening system.

48. The method of claim 41, wherein subsequent to the formation of the heads, the stems have a height of between about 50 percent and about 90 percent the height prior to formation of the heads.

49. The method of claim 41, wherein subsequent to the formation of the heads, the stems have a height of between about 60 percent and about 80 percent the height prior to formation of the heads, and particularly a height of about 70 percent said height prior to formation of the heads.

50. The method of claim 35, wherein the distance between upper surface of the piece and the underside of the piece is between about 0.5 mm and 8 mm; or between about 1 mm and 7 mm; or between about 2 mm and about 6 mm; or between about 2 mm and 5 mm; or between about 2 and about 4 mm; or about 3 and about 3.5 mm.

51. The method of claim 50, wherein said distance relative to the height of the stems prior to formation of the heads is between about 1 and about 25; or between about 1 and about 20; or between about 1 and 15; or between about 2 and about 10; or between about 2 and about 5; or between about 3 and about 4; or about 3.5.

52. The method of claim 35, further comprising the step of interposing a forming sheet between the stems and the heated surface of the coining apparatus prior to pressing the heated surface against the distal ends of the stems, wherein sheet has a surface in abutment with the stems, which surface is of a material that substantially precludes adhesion of the sheet to the stems.

53. The method of claim 52, wherein the forming sheet has a thickness of between 0.1 mm and about 0.5 mm, or between about 0.125 mm and 0.25 mm.

54. The method of claim 51, wherein the forming sheet comprises a material selected from the group of materials consisting of polyester, nylon, glass fiber reinforced teflon, and teflon.

55. The method of claim 35, wherein the resilient layer has the resilience of silicon foam or of ⅜ inch polyethylene foam having a density of 2 pounds per cubic foot.

56. The method of claim 35, wherein the resilient layer comprises silicon foam or polyethylene foam.

57. The method of claim 35, wherein the resilient layer has a thickness of between about ¼ inch and about ½ inch, or about ⅜ inch.

* * * * *